US007680326B2

(12) United States Patent
Kameyama

(10) Patent No.: US 7,680,326 B2
(45) Date of Patent: Mar. 16, 2010

(54) METHOD, SYSTEM, AND PROGRAM FOR CORRECTING THE IMAGE QUALITY OF A MOVING IMAGE

(75) Inventor: Hirokazu Kameyama, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 1155 days.

(21) Appl. No.: 11/082,783

(22) Filed: Mar. 18, 2005

(65) Prior Publication Data

US 2005/0207669 A1 Sep. 22, 2005

(30) Foreign Application Priority Data

Mar. 18, 2004 (JP) ............................. 2004-078205
Mar. 22, 2004 (JP) ............................. 2004-082804

(51) Int. Cl.
*G06K 9/00* (2006.01)
*G06K 9/40* (2006.01)
(52) U.S. Cl. ...................................... 382/167; 382/254
(58) Field of Classification Search ................. 382/167, 382/254, 255, 260, 261, 262, 263, 264, 265, 382/266, 274, 298, 299, 300; 345/3.3, 698; 348/683; 358/1.9, 2.1, 461, 463, 525
See application file for complete search history.

(56) References Cited

U.S. PATENT DOCUMENTS 5,885,218 A * 3/1999 Teo et al. .................... 600/443
6,753,910 B1 6/2004 Ogata et al.
7,075,982 B2 * 7/2006 Koto ...................... 375/240.03
7,221,478 B2 * 5/2007 Wada et al. .................... 358/1.9
2002/0145678 A1 10/2002 Suzuki et al.
2003/0169346 A1 * 9/2003 Ojima et al. ........... 348/207.99
2004/0126021 A1 * 7/2004 Sull et al. .................... 382/233
2006/0215924 A1 * 9/2006 Steinberg et al. ............ 382/254

FOREIGN PATENT DOCUMENTS

JP 2000-156797 A 6/2000

* cited by examiner

*Primary Examiner*—Brian Q Le
(74) *Attorney, Agent, or Firm*—Sughrue Mion, PLLC

(57) ABSTRACT

An image processing system has a scale-down section for scaling down frames of a moving image to obtain thumbnail images, a temporary correction value calculation section for calculating a temporary correction value by employing a first feature quantity calculated from the thumbnail image by a feature quantity calculation section, and a temporary correction section for calculating a second feature quantity of a temporarily corrected thumbnail image obtained by correcting each thumbnail image with the temporary correction value. The image processing system further has a target feature quantity calculation section for calculating a target feature quantity of each frame so that the second feature quantities vary smoothly in a temporal direction, an object correction value calculation section for calculating an object correction value so that the first feature quantity becomes the target feature quantity, and a correction section for obtaining a corrected moving image by correcting each frame with the object correction value.

19 Claims, 18 Drawing Sheets

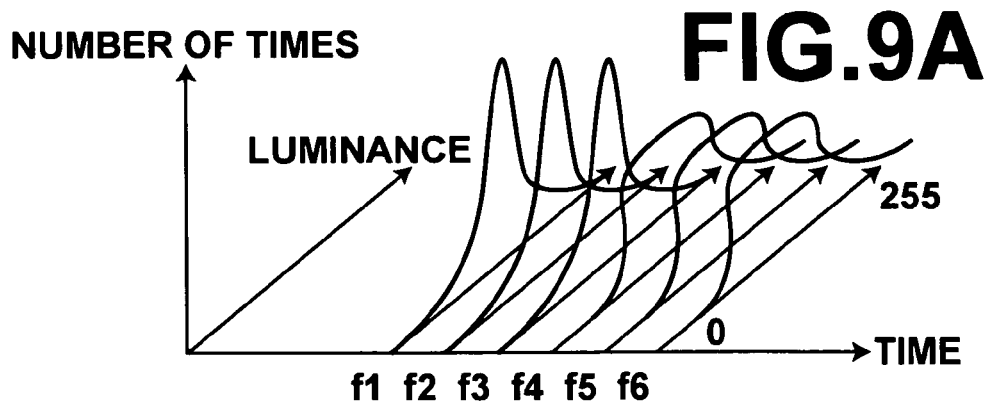
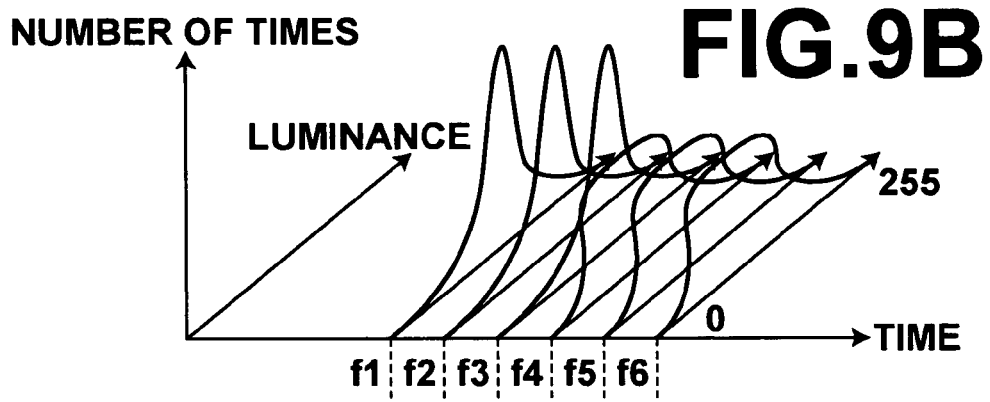
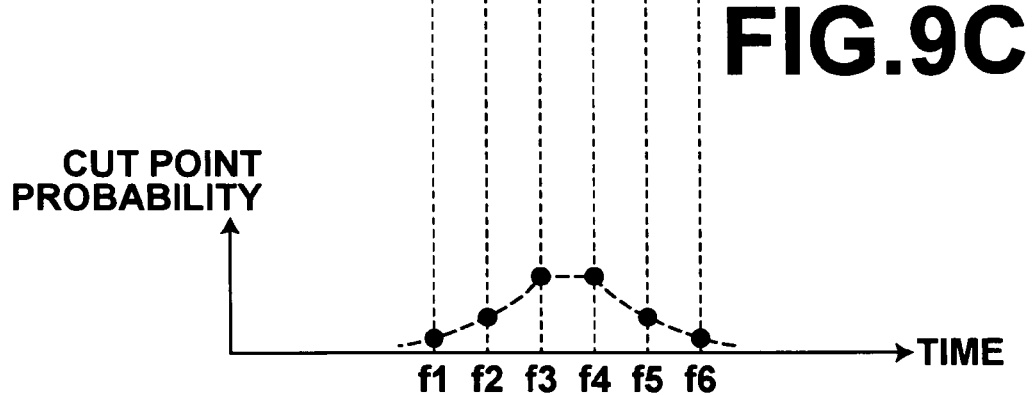

| CUT POINT PROBABILITY $\beta 0$ | FILTER F |
|---|---|
| 0 | 1 \| 1 \| 1 \| 1 \| 1 |
| ⋮ | ⋮ |
| 0.5 | 0 \| 1 \| 3 \| 1 \| 0 |
| ⋮ | ⋮ |
| 1 | 0 \| 0 \| 5 \| 0 \| 0 |

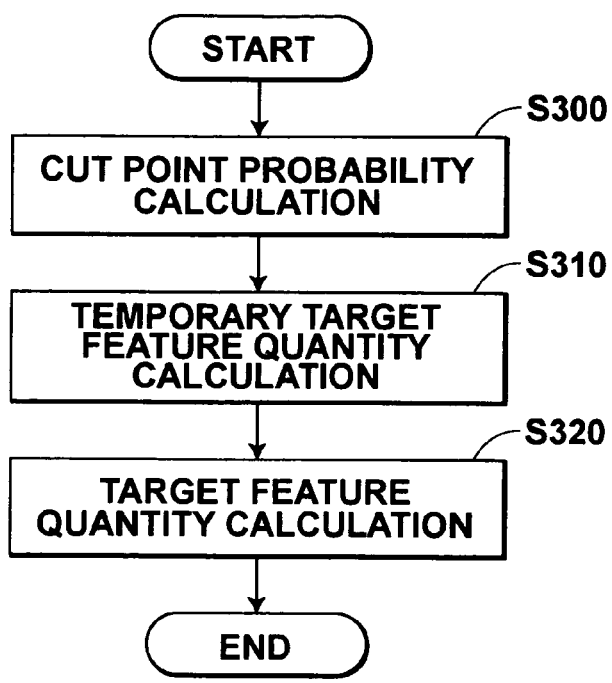
FIG.18
FIG.19
A   B   C

METHOD, SYSTEM, AND PROGRAM FOR CORRECTING THE IMAGE QUALITY OF A MOVING IMAGE

BACKGROUND OF THE INVENTION

1. Field of the Invention

The present invention relates to image processing methods and systems for correcting the image quality of a moving image, and programs for carrying out the methods.

2. Description of the Related Art

Correcting original digital images for image quality has been widely performed so that the digital images look attractive. Typical examples are white balance correction, exposure correction, color saturation correction, contrast correction, sharpness correction, color correction, etc. As a method of correcting a still image, it is a well known technique to extract a feature quantity from the still image, calculate a correction value based on the extracted feature quantity, and correct the original image with the correction value. The feature quantity to be extracted from a still image can employ an average luminance value for the original image, an average luminance value in a dark region within the original image, an average luminance value for a main photographed body (person's face, etc.) in the original image, an average saturation value in a high saturation region within the original image, an average gradation value for red, green, and blue (RGB) components in a light region within the original image, a hue histogram within the original image, etc., depending on the content of correction processes, such as white balance correction, color saturation correction, etc.

The aforementioned method for correcting the image quality of a still image can be applied to the correction of the image quality of a moving image. That is, a moving image can be corrected by considering each of the picture frames of the moving image as a still image, then extracting a feature quantity from each picture frame, then calculating a correction value for each frame image based on the extracted feature quantity, and correcting each picture frame with the correction value.

However, the picture frames of a moving image vary in a temporal direction and the feature quantities also vary, so if the still-image correcting method is performed on each of the picture frames, flickering of a corrected moving image comprising the corrected picture frames will occur. To avoid the flickering of a corrected moving image, a method for smoothing variation of correction values for the picture frames of a moving image is disclosed in U.S. Patent Application Publication No. 20020145678. More specifically, there has been proposed a method for inhibiting the flickering of a corrected moving image by limiting the difference between a correction value for the present picture frame and a correction value for the previous picture frame to less than a predetermined threshold value. There is also a method for using as a correction value for the present picture frame a value obtained by taking the average (moving average) of (1) a correction value for the present picture frame and (2) a correction value for the picture frame before the present picture frame and/or a correction value for the picture frame after the present picture frame.

For moving images, there are different scenes such as interior scenes and exterior scenes, and the respective picture frames of these different scenes have no connection with each other. Therefore, if variation of correction values for picture frames is inhibited in order to prevent the flickering of a corrected moving image, an object correction value for a picture frame that becomes a cut point (the first and last picture frames of one scene) representing a switch from one scene to another will be influenced by a correction value for a picture frame of a different scene. For example, the last picture frame of scene-1 and the first picture frame of the following scene-2 are picture frames adjacent in the temporal direction, but they have no connection with each other. Therefore, if an object correction value is obtained, for example, by taking the moving average of correction values for picture frames to avoid the flickering of a corrected moving image, an object correction value for the last picture frame of the scene-1 is obtained by taking the average of this picture frame and the two picture frames before and after that frame (including the first picture frame of the scene-2). Thus, the object correction value for the last picture frame of the scene-1 is unsuitable. To solve this problem, the aforementioned U.S. Patent Application Publication No. 20020145678 discloses a method that does not use a correction value for a picture frame of a scene differing from an picture frame of interest, when detecting a cut point that represents a switch from one scene to another in a moving image, and smoothing variation of correction values for picture frames to calculate an object correction value for a picture frame.

However, a method for smoothing variation of correction values, such as that disclosed in the aforementioned U.S. Patent Application Publication No. 20020145678, inhibits fluctuations only with respect to correction values, and can eliminate the flickering of correction values when a fluctuation in the temporal direction of a picture frame is slight, but cannot eliminate the flickering of a corrected moving image.

In digital still cameras (DSCs), corrections are sometimes made in obtaining a moving image by photography. When these corrections are inappropriate, discontinuous corrections will have an adverse influence on the image quality of the moving image.

On the other hand, in a moving image, there are cases where picture frames vary rapidly within the same scene. As shown in FIG. 19, for instance, three picture frames A, B, and C, obtained by photographing a person moving at high speeds in a close-up, are picture frames within the same scene, but the content of the image varies considerably between them. The method in the aforementioned U.S. Patent Application Publication No. 20020145678 can calculate an appropriate correction value for a picture frame that becomes a cut point. However, if in calculating an object correction value for the picture frame B shown in FIG. 19, it is decided that the picture frame B is a cut point, and a correction value calculated from the picture frame B is used as an object correction value for the picture frame B, the flickering of a corrected moving image in the same scene will occur because the object correction values between the picture frame B and the picture frames A, C are not smoothed. On the other hand, if it is decided that the picture frame B is not a cut point, and the average value of the correction values for the picture frames A, B, and C is used as an object correction value for the picture frame B, the image quality is not good because differences among the picture frame B and the picture frames A, C are not reflected.

SUMMARY OF THE INVENTION

In view of the aforementioned circumstances, it is a first object of the present invention to provide an image processing method, an image processing system, and an image processing program that are capable of calculating correction values for the picture frames of a moving image and reliably eliminating the flickering of a corrected moving image. A second object of the present invention is to provide an image processing method, an image processing system, and an image processing program which are capable of eliminating the flickering of a corrected moving image, and also suitably correcting a picture frame whose fluctuation in a temporal direction is great in the same scene, as well as a picture frame that becomes a cut point representing a switch from one scene to another.

To achieve the aforementioned objects of the present invention, a first image processing method of the present invention comprises five major steps: (1) a feature quantity calculation step of calculating a feature quantity of each of a plurality of picture frames that constitute a moving image; (2) a temporary correction value calculation step of calculating a temporary correction value for correcting picture quality of each of the picture frames, from the picture frame; (3) a temporary correction step of calculating a feature quantity of a temporarily corrected picture frame obtained by correcting each of the picture frames with the temporary correction value; (4) a target feature quantity calculation step of calculating a value, obtained by adjusting the feature quantities of the temporarily corrected picture frames so that the feature quantities vary smoothly in a temporal direction, as a target feature quantity of the picture frame to which the temporarily corrected picture frame corresponds; and (5) an object correction value calculation step of calculating an object correction value for each of the picture frames so that the feature quantity of each of the picture frames becomes approximately equal to the target feature quantity of the picture frame.

Here, the expression "adjusting the feature quantities of the temporarily corrected picture frames so that the feature quantities vary smoothly in a temporal direction" means that the variation of the feature quantities of corrected picture frames is inhibited. More specifically, the feature quantities can be adjusted as follows: (1) a value, obtained by calculating the average of (a) a temporary correction value for an picture frame of interest and (b) a temporary correction value for the picture frame before the picture frame of interest and/or a temporary correction value for the picture frame after the picture frame of interest, is calculated as an object correction value for the picture frame of interest; (2) values, obtained by passing temporary correction values for successive picture frames through a low-pass filter, are calculated as object correction values for the picture frames; or (3) values, obtained by performing an interpolation process on temporary correction values for successive picture frames, are calculated as object correction values for the picture frames. Since the low-pass filter process and the interpolation process are used to smooth fluctuations in temporary correction values, it is preferable to employ a high-order low-pass filter as a filter and a spline interpolation method as an interpolation method.

In the first image processing method of the present invention, the aforementioned target feature quantity is calculated for each of the picture frames of a moving image, and an object correction value for each picture frame is calculated so that the feature quantity of the picture frame becomes the target feature quantity. The aforementioned temporary correction value calculation step, temporary correction step, and target quantity calculation step may be performed on all the picture frames, but to save the processing time, the temporary correction value calculation step, the temporary correction step, and the target feature quantity calculation step may be performed on only reference picture frames selected from the plurality of picture frames. The target feature quantity of each of the picture frames may be obtained by performing an interpolation process on each of the target feature quantities obtained by employing the reference picture frames.

In the first image processing method of the present invention, the feature quantity calculation step, the temporary correction value calculation step, the temporary correction step, the target feature quantity calculation step, and the object correction value calculation step are preferably performed employing thumbnail images of the picture frames that constitute the moving image.

The first image processing method of the present invention may further have a correction step of correcting the picture frame to which the object correction value corresponds, employing the object correction value.

In accordance with the present invention, there is provided a first image processing system. The first image processing system comprises five major parts: (1) feature quantity calculation means for calculating a feature quantity of each of a plurality of picture frames that constitute a moving image; (2) temporary correction value calculation means for calculating a temporary correction value for correcting picture quality of each of the picture frames, from the picture frame; (3) temporary correction means for calculating a feature quantity of a temporarily corrected picture frame obtained by correcting each of the picture frames with the temporary correction value calculated by the temporary correction value calculation means; (4) target feature quantity calculation means for calculating a value, obtained by adjusting the feature quantities of the temporarily corrected picture frames so that the feature quantities vary smoothly in a temporal direction, as a target feature quantity of the picture frame to which the temporarily corrected picture frame corresponds; and (5) object correction value calculation means for calculating an object correction value for each of the picture frames so that the feature quantity of each of the picture frames calculated by the feature quantity calculation means becomes approximately equal to the target feature quantity of the picture frame.

In the first image processing system of the present invention, the temporary correction value calculation means, the temporary correction means, and the target feature quantity calculation means may respectively perform the aforementioned calculations on only reference picture frames selected from the plurality of picture frames. The first image processing system of the present invention may further have interpolation means for obtaining the target feature quantity of each of the plurality of picture frames by performing an interpolation process on each of the target feature quantities obtained by employing the reference picture frames.

In the first image processing system of the present invention, the feature quantity calculation means, the temporary correction value calculation means, the temporary correction means, the target feature quantity calculation means, and the object correction value calculation means preferably perform the aforementioned calculations, employing thumbnail images of the picture frames that constitute the moving image.

The first image processing system of the present invention may further have correction means for correcting the picture frame to which the object correction value corresponds, employing the object correction value.

In accordance with the present invention, there is provided a second image processing method. The second image processing method comprises three major steps: (1) a temporary correction value calculation step of calculating a temporary correction value for correcting picture quality of each of a plurality of picture frames that constitute a moving image, for each of the picture frames; (2) an object correction value calculation step of calculating a value, obtained by adjusting the temporary correction values so that the temporary correction values vary smoothly in a temporal direction, as an object correction value for the picture frame; and (3) a cut point probability calculation step of calculating a cut point probability, which is the magnitude of a probability of the picture frame being a cut point representing a switch from one scene to another in the moving image, for each of the picture frames. In this case, the object correction value calculation step calculates the object correction value by adjusting a degree of the adjustment relative to the temporary correction values of the picture frames according to a magnitude of the cut point probability.

In the second image processing method of the present invention, the "temporary correction value for a picture frame" refers to a correction value for correcting picture quality of a picture frame of interest, obtained from this picture frame.

In the second image processing method of the present invention, the expression "adjusting the temporary correction values so that the temporary correction values vary smoothly in a temporal direction" means that the variation of the temporary correction values is inhibited. More specifically, the temporary correction values can be adjusted as follows: (1) a value, obtained by calculating the average of (a) the feature quantity of a temporarily corrected picture frame of interest and (b) the feature quantity of the temporarily corrected picture frame before the picture frame of interest and/or the feature quantity of the temporarily corrected picture frame after the picture frame of interest, is calculated as a target feature quantity for the temporarily corrected picture frame of interest; (2) values, obtained by passing the feature quantities of temporarily corrected successive picture frames through a low-pass filter, are calculated as target feature quantities of the temporarily corrected picture frames; or (3) values, obtained by performing an interpolation process on the feature quantities of temporarily corrected successive picture frames, are calculated as target feature quantities of the temporarily corrected picture frames. Since the low-pass filter process and the interpolation process are used to smooth the feature quantities of temporarily corrected picture frames, it is preferable to employ a high-order low-pass filter as a filter and a spline interpolation method as an interpolation method.

The adjustment of a temporary correction value can be performed by various methods, as described above. However, since the adjustment is to inhibit the difference between (1) a temporary correction value for a picture frame of interest and (2) a temporary correction value for the picture frame before the picture frame of interest and/or a temporary correction value for the picture frame after the picture frame of interest, a temporary correction value for one picture frame will be influenced by a temporary correction value for the picture frame before the one picture frame and/or a temporary correction value for the picture frame after the one picture frame. For that reason, the degree of adjustment of a temporary correction value for a picture frame is equivalent to a degree that an object correction value for a picture frame of interest is influenced by a temporary correction value for the picture frame before the picture frame of interest and/or a temporary correction value for the picture frame after the picture frame of interest. That is, in calculating an object correction value for a picture frame of interest, the second image processing method of the present invention adjusts the degree of influence of a temporary correction value for the picture frame before the picture frame of interest and/or a temporary correction value for the picture frame after the picture frame of interest, according to the magnitude of the cut point probability of the picture frame of interest.

The "cut point probability" represents the magnitude of the probability of a picture frame of interest being a cut point that represents a switch from one scene to another in a moving image. The cut point is the last or first picture frame of a single scene in a moving image. The cut point probability of a picture frame at a cut point has the maximum value, but the cut point probability of a picture frame where a change in an image is great in the same scene (e.g., a picture frame shown in FIG. 19) is often less than the maximum value.

The cut point probability relates to the magnitude and/or form of a fluctuation in the feature quantity of a picture frame in a temporal direction. Therefore, the cut point probability of each picture frame can be calculated based on a fluctuation in the feature quantity of a picture frame. For example, when the difference between the feature quantity of a picture frame of interest and the feature quantity just before or just after the picture frame of interest is a first threshold value or greater, the cut point probability of the picture frame of interest can be calculated as the maximum value (=1). Also, when the difference between the feature quantity of a picture frame of interest and the feature quantity just before or just after the picture frame of interest is a second threshold value or less (second threshold value<first threshold value), the cut point probability of the picture frame of interest can be calculated as the minimum value (=0). When the difference between the feature quantity of a picture frame of interest and the feature quantity just before or just after the picture frame of interest is between the first threshold and the second threshold value, the cut point probability of the picture frame of interest can be calculated as a value between 0 and 1. The cut point probability does not always need to be based on the difference between the feature quantities of two picture frames. For instance, the cut point probability may be calculated based on the difference between the feature quantity of a picture frame of interest and the average value of the feature quantities of picture frames before or after the picture frame of interest.

A feature quantity used in calculating a cut point probability may employ an average pixel value within the entire picture frame or within a region excluding a high pixel value region and a low pixel value region, but it is preferable to employ the configuration of a histogram for the pixel values of a picture frame. The reason for that is as follows. The configuration of a histogram of pixel values of a picture frame of interest at a cut point differs greatly from that of a histogram of pixel values of the picture frame before or after the picture frame of interest. On the other hand, in the case of a scene shown in FIG. 19, the configuration of pixel values of a picture frame varies according to the ratio of a photographed object to the entire picture frame and does not vary greatly compared with the case of a cut point. Therefore, a fluctuation in the configuration of a histogram of pixels values of a picture frame can be reflected directly as the cut point probability of the picture frame. Also, the difference between the configurations of histograms can employ the correlation between the configurations of histograms. For example, the difference becomes smaller as the correlation becomes greater.

Note that the aforementioned description on the cut point probability and calculation of the cut point probability can be applied to all image processing methods, systems, and programs of the present invention. Therefore, in the following description, a detailed description on the cut point probability and calculation of the cut point probability will be omitted.

In the second image processing method of the present invention, the aforementioned object correction value calculation step preferably makes the degree of the adjustment smaller as the magnitude of the cut point probability becomes greater. That is, it is preferable to adjust the degree of the adjustment so as to reduce the influence of the picture frame before or after the picture frame whose cut point probability is great.

In accordance with the present invention, there is provided a third image processing method. The third image processing method comprises four major steps: (1) a feature quantity calculation step of calculating a feature quantity of each of a plurality of picture frames that constitute a moving image; (2) a target feature quantity calculation step of performing on each of the picture frames a target feature quantity calculation process of calculating a target value for the feature quantity of the picture frame so that feature quantities of corrected picture frames obtained by correcting the picture frames vary smoothly in a predetermined degree of smoothness in a temporal direction; (3) an object correction value calculation step of calculating an object correction value for each of the picture frames so that the feature quantity of the picture frame becomes approximately equal to the target feature quantity of the picture frame; and (4) a cut point probability calculation step of calculating a cut point probability, which is the magnitude of a probability of the picture frame being a cut point representing a switch from one scene to another in the moving image, for each of the picture frames. In this case, the target feature quantity calculation step calculates the target feature quantity by adjusting the degree of smoothness when calculating the target feature quantity of the picture frame, according to a magnitude of the cut point probability.

In the third image processing method of the present invention, the target feature quantity calculation step preferably makes the degree of smoothness smaller as the magnitude of the cut point probability becomes greater.

As previously described, when correcting the image quality of a moving image, each of the picture frames of the moving image is considered as a still image, and if the feature quantity is extracted for each picture frame, and the picture frame is corrected with a correction value calculated based on the extracted feature quantity, the flickering of the corrected moving image will occur. In order to avoid this problem, the third image processing method of the present invention performs on each of the picture frames the target feature quantity calculation process of calculating a target value for the feature quantity of the picture frame so that feature quantities of corrected picture frames obtained by correcting the picture frames vary smoothly in a predetermined degree of smoothness in a temporal direction. The third image processing method of the present invention also calculates an object correction value for each of the picture frames so that the feature quantity of the picture frame becomes approximately equal to the target feature quantity of the picture frame. Furthermore, the degree of smoothness in calculating the target feature quantity of the picture frame is adjusted according to the magnitude of the cut point probability.

A method of adjusting the degree of smoothness varies, depending on a method of calculating target feature quantities.

For example, in the third image processing method of the present invention, the aforementioned target feature quantity calculation step may comprise three steps: (1) a temporary correction value calculation step of calculating a temporary correction value for correcting picture quality of each of the picture frames, from the picture frame; (2) a temporary correction step of calculating a feature quantity of a temporarily corrected picture frame obtained by correcting each of the frame pictures with the temporary correction value; and (3) a feature quantity smoothing step of calculating a value, obtained by adjusting the feature quantities of the temporarily corrected picture frames so that the feature quantities vary smoothly in a temporal direction, as a target feature quantity of the picture frame to which the temporarily corrected picture frame corresponds. In this case, the feature quantity smoothing step may adjust the degree of the aforementioned adjustment according to the magnitude of the cut point probability. Preferably, the degree of adjustment to the feature quantity of a temporarily corrected picture frame is made smaller as the cut point probability becomes greater. In this case, the aforementioned degree of adjustment is equivalent to the aforementioned degree of smoothness. Here, the expression "adjusting the feature quantities of the temporarily corrected picture frames so that the feature quantities vary smoothly in a temporal direction" means that the variation of the feature quantities of corrected picture frames is inhibited. More specifically, the feature quantities can be adjusted as follows: (1) a value, obtained by calculating the average (including a weighted average) of (a) a temporary correction value for a picture frame of interest and (b) a temporary correction value for the picture frame before the picture frame of interest and/or a temporary correction value for the picture frame after the picture frame of interest, is calculated as an object correction value for the picture frame of interest; (2) values, obtained by passing temporary correction values for successive picture frames through a low-pass filter, are calculated as object correction values for the picture frames; or (3) values, obtained by performing an interpolation process on temporary correction values for successive picture frames, are calculated as object correction values for the picture frames. Since the low-pass filter process and the interpolation process are used to smooth fluctuations in temporary correction values, it is preferable to employ a high-order low-pass filter as a filter and a spline interpolation method as an interpolation method. Hence, for example, in the case where a value, obtained by calculating the weighted average of (1) the feature quantity of a temporarily corrected picture frame of interest and (2) the feature quantity of the temporarily corrected picture frame before the picture frame of interest and/or the feature quantity of the temporarily corrected picture frame after the picture frame of interest, is calculated as the target feature quantity of a picture frame to which the picture frame of interest corresponds, the weight of the feature quantity of the picture frame of interest is made greater as the cut point probability of the picture frame becomes greater. That is, the weight of the feature quantity of the temporarily corrected picture frame before the picture frame of interest (and/or the weight of the feature quantity of the temporarily corrected picture frame after the picture frame of interest) is made smaller as the cut point probability of the picture frame becomes greater. In this manner, the weighted average can be calculated. The degree of smoothness in this case is equivalent to the weight of the feature quantity of the temporarily corrected picture frame before the picture frame of interest and/or the weight of the feature quantity of the temporarily corrected picture frame after the picture frame of interest.

Also, in the case where smoothing is performed by selecting a representative picture frame (which does not always need to be a picture frame of interest) from a picture frame of interest and the picture frame before the picture frame of interest and/or the picture frame after the picture frame of interest, and then calculating the weighted average of the feature quantity of a temporarily corrected picture frame corresponding to the representative picture frame and the feature quantity of the picture frame of interest, the weight of the feature quantity of the temporarily corrected picture frame of the picture frame of interest is made greater as the cut point probability of the picture frame becomes greater. That is, the weight of the feature quantity of the temporarily corrected picture frame of the representative picture frame is made smaller as the cut point probability of the picture frame becomes greater. In this manner, the weighted average can be calculated. The degree of smoothness in this case is equivalent to the weight of the feature quantity of the temporarily corrected picture frame of the representative picture frame. In this case, it is preferable to select a picture frame which is lightest or a picture frame whose temporary correction value is smallest, as the representative picture frame, in order to enhance image quality.

The adjustment of target feature quantities can be performed by various methods, as described above. However, since the adjustment is to inhibit the difference between (1) the target feature quantity of a picture frame of interest and (2) the target feature quantity of the picture frame before the picture frame of interest and/or the target feature quantity of the picture frame after the picture frame of interest, the target feature quantity of one picture frame will be influenced by the feature quantity of a temporarily corrected picture frame corresponding to the picture frame before the one picture frame and/or the picture frame after the one picture frame. For that reason, the degree of adjustment of the feature quantity of a temporarily corrected picture frame is equivalent to a degree that the target feature quantity of a picture frame of interest is influenced by the feature quantity of a temporarily corrected picture frame corresponding to the picture frame before the one picture frame and/or the picture frame after the one picture frame (or the aforementioned representative picture frame).

In the third image processing method of the present invention, the aforementioned target feature quantity calculation step may comprise four steps: (1) a temporary correction value calculation step of calculating a temporary correction value for correcting picture quality of each of the picture frames, from the picture frame; (2) a temporary correction step of calculating a feature quantity of a temporarily corrected picture frame obtained by correcting each of the frame pictures with the temporary correction value; (3) a feature quantity smoothing step of calculating a value, obtained by adjusting the feature quantities of the temporarily corrected picture frames so that the feature quantities vary smoothly in a temporal direction, as a target feature quantity of the picture frame to which the temporarily corrected picture frame corresponds; and (4) a weighted addition step of calculating a value, obtained by the weighted addition of the feature quantity of the temporarily corrected picture frame and the temporary target feature quantity of the picture frame, as a target feature quantity of the picture frame. In this case, the weighted addition step may adjust weight of the temporary target feature quantity according to the magnitude of the cut point probability. Preferably, the weight of the temporary target feature quantity is made smaller as the cut point probability becomes greater.

Here, the expression "adjust weight of the temporary target feature quantity" means that the weight of the temporary target feature quantity is adjusted in performing the weighted addition of the feature quantity of a temporarily corrected picture frame and the temporary feature quantity of a picture frame. Therefore, if the weight of a temporary target feature quantity is adjusted, the weight of a feature quantity will be necessarily adjusted. Conversely, if the weight of a feature quantity is adjusted, the weight of a temporary target feature quantity will be adjusted. Note that the weight of a temporary target feature quantity in this case is equivalent to the degree of smoothness in the present invention.

The third image processing method of the present invention calculates a target feature quantity for each of the picture frames of a moving image, and calculates an object correction value for each picture frame so that the feature quantity of the picture frame becomes the target feature quantity. The aforementioned temporary correction value calculation step may be performed on all the picture frames, but to save the processing time, the target feature quantity calculation step may perform the calculation of the target feature quantity on only reference picture frames selected from the picture frames of a moving image. The target feature quantity of each of the plurality of picture frames may be obtained by performing an interpolation process on each of the target feature quantities obtained by employing the reference picture frames.

In the second and third image processing methods of the present inventions, the temporary correction value calculation step, the object correction value calculation step, and the cut point probability calculation step are preferably performed on the thumbnail images of the picture frames that constitute the moving image.

The second and third image processing methods of the present inventions may further include a correction step of correcting the picture frame to which the object correction value corresponds, employing the aforementioned object correction value.

A second image processing system of the present invention comprises three major parts: (1) temporary correction value calculation means for calculating a temporary correction value for correcting picture quality of each of a plurality of picture frames that constitute a moving image, for each of the picture frames; (2) object correction value calculation means for calculating a value, obtained by adjusting the temporary correction values so that the temporary correction values vary smoothly in a temporal direction, as an object correction value for the picture frame; and (3) cut point probability calculation means for calculating a cut point probability, which is the magnitude of a probability of the picture frame being a cut point representing a switch from one scene to another in the moving image, for each of the picture frames. In this case, the object correction value calculation means calculates the object correction value by adjusting the degree of the adjustment relative to the temporary correction values of the picture frames according to a magnitude of the cut point probability.

In the second image processing system, the aforementioned object correction value calculation means preferably makes the degree of the adjustment smaller as the magnitude of the cut point probability becomes greater.

A third image processing system comprises four major parts: (1) feature quantity calculation means for calculating a feature quantity of each of a plurality of picture frames that constitute a moving image; (2) target feature quantity calculation means for performing on each of the picture frames a target feature quantity calculation process of calculating a target value for the feature quantity of the picture frame so that feature quantities of corrected picture frames obtained by correcting the picture frames vary smoothly in a predetermined degree of smoothness in a temporal direction; (3) object correction value calculation means for calculating an object correction value for each of the picture frames so that the feature quantity of the picture frame becomes approximately equal to the target feature quantity of the picture frame; and (4) cut point probability calculation means for calculating a cut point probability, which is the magnitude of a probability of the picture frame being a cut point representing a switch from one scene to another in the moving image, for each of the picture frames. In this case, the target feature quantity calculation means calculates the target feature quantity by adjusting the degree of smoothness when calculating the target feature quantity of the picture frame, according to a magnitude of the cut point probability calculated by the cut point probability calculation means.

In the third image processing system of the present invention, the aforementioned target feature quantity calculation means preferably makes the degree of smoothness smaller as the magnitude of the cut point probability becomes greater.

In the third image processing system of the present invention, the aforementioned target feature quantity calculation means preferably comprises three parts: (1) temporary correction value calculation means for calculating a temporary correction value for correcting picture quality of each of the picture frames, from the picture frame; (2) temporary correction means for calculating a feature quantity of a temporarily corrected picture frame obtained by correcting each of the frame pictures with the temporary correction value; and (3) feature quantity smoothing means for calculating a value, obtained by adjusting the feature quantities of the temporarily corrected picture frames so that the feature quantities vary smoothly in a temporal direction, as a target feature quantity of the picture frame to which the temporarily corrected picture frame corresponds. In this case, the aforementioned feature quantity smoothing means preferably adjusts the degree of the adjustment according to the magnitude of the cut point probability.

In the third image processing system of the present invention, the aforementioned target feature quantity calculation means preferably comprises four major parts: (1) temporary correction value calculation means for calculating a temporary correction value for correcting picture quality of each of the picture frames, from the picture frame; (2) temporary correction means for calculating a feature quantity of a temporarily corrected picture frame obtained by correcting each of the frame pictures with the temporary correction value; (3) feature quantity smoothing means for calculating a value, obtained by adjusting the feature quantities of the temporarily corrected picture frames so that the feature quantities vary smoothly in a temporal direction, as a target feature quantity of the picture frame to which the temporarily corrected picture frame corresponds; and (4) weighted addition means for calculating a value, obtained by the weighted addition of the feature quantity of the temporarily corrected picture frame and the temporary target feature quantity of the picture frame, as a target feature quantity of the picture frame. In this case, the aforementioned weighted addition means preferably adjusts weight of the temporary target feature quantity according to the magnitude of the cut point probability.

In the third image processing system of the present invention, the aforementioned target feature quantity calculation means preferably performs the calculation of the target feature quantity on only reference picture frames selected from the plurality of picture frames. Preferably, the third image processing system of the present invention further includes interpolation means for obtaining the target feature quantity of each of the plurality of picture frames by performing an interpolation process on each of the target feature quantities obtained by employing the reference picture frames.

In the third image processing system of the present invention, the feature quantity calculation means, the target feature quantity calculation means, the object correction value calculation means, and the cut point probability calculation means preferably perform the aforementioned calculations, employing thumbnail images of the picture frames that constitute the moving image.

The second and third image processing systems of the present invention may further have correction means for correcting the picture frame to which the object correction value corresponds, employing the object correction value.

Note that the first, second, and third image processing methods of the present invention may be provided as programs for causing a computer to execute these methods.

Note also that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language, including higher level languages, assembly language, and machine language.

According to the first image processing method and system of the present invention, a temporary correction value is calculated for each of the picture frames of a moving image. The feature quantities of temporarily corrected picture frames, obtained by correcting each of the picture frames with the temporary correction value, are calculated. A value, obtained by adjusting the feature quantities of the temporarily corrected picture frames so that the feature quantities vary smoothly in a temporal direction, is calculated as a target feature quantity. And an object correction value for each of the picture frames is calculated so that the feature quantity of each of the picture frames becomes approximately equal to the target feature quantity of the picture frame. Therefore, the object correction value is obtained by directly inhibiting the target feature quantity, that is, variation of the feature quantities of picture frames corrected, while possessing the effect of an enhancement in image quality obtained by temporary correction. Therefore, the first image processing method and system of the present invention are capable of more reliably eliminating the flickering of a corrected moving image than conventional methods for inhibiting only the variation of temporary correction values. The first image processing method and system of the present invention can also eliminate discontinuous corrections that result from inappropriate corrections made in digital still cameras (DSCs)

According to the second image processing method and system of the present invention, temporary correction values are calculated for the picture frames of a moving image. When a value, obtained by adjusting a change in the temporary correction values in a temporal direction, is calculated as an object correction value, the degree of the adjustment is adjusted according to the magnitude of the cut point probability of each picture frame. In this manner, an object correction value for a picture frame can adjust a degree that is influenced by the temporary correction values for the two picture frames before and after that picture frame. For instance, if the degree of adjustment is made smaller as the cut point probability becomes greater, an object correction value for a picture frame which becomes a cut point (picture frame whose cut point probability is greatest) can be prevented from being influenced by the temporary correction values for the two picture frames before and after that picture frame. Thus, an appropriate correction value for a picture frame at a cut point can be calculated. In addition, an object correction value for a picture frame whose variation is small in the same scene (ordinary picture frame whose cut point probability is small)

is influenced by the temporary correction values for the two picture frames before and after that picture frame and varies smoothly in the temporal direction. Therefore, the flickering of a corrected moving image can be eliminated. Furthermore, in the case of a picture frame where a change in an image is great in the same scene (picture frame whose cut point probability is less than that of a picture frame at a cut point but greater than that of an ordinary picture frame), as shown in FIG. 19, the object correction value is influenced by the temporary correction values for the two picture frames before and after that picture frame, but the degree of influence is smaller than that of an ordinary picture frame. For that reason, a suitable correction can be made on even a picture frame where a change in an image is great in the same scene, while eliminating the flickering of a corrected moving image.

According to the third image processing method and system of the present invention, a target value for the feature quantity of the picture frame is calculated so that the feature quantities of corrected picture frames obtained by correcting the picture frames vary smoothly in a predetermined degree of smoothness in a temporal direction. A target feature quantity is calculated by adjusting the degree of smoothness according to the magnitude of the cut point probability. An object correction value is calculated so that the feature quantity of the picture frame before correction becomes equal to the target feature quantity. In this manner, an object correction value for a picture frame can adjust a degree that is influenced by the temporary correction values for the two picture frames before and after that picture frame. For example, the degree of adjustment can be made smaller as the cut point probability becomes greater. Thus, the third image processing method and system of the present invention can have the same advantages as the second image processing method and system of the present invention.

BRIEF DESCRIPTION OF THE DRAWINGS

The present invention will be described in further detail with reference to the accompanying drawings wherein:

FIG. 3, which includes

FIG. 9, which includes FIGS. 9A, 9B, and 9C, is a diagram used to explain how cut point probabilities are calculated;

FIG. 14, which includes

FIG. 18 is a flowchart showing processing steps performed in the target feature quantity calculation means of the image processing system shown in FIG. 17; and FIG. 19 is a pictorial diagram showing picture frames whose fluctuation is great in the same scene.

DESCRIPTION OF THE PREFERRED EMBODIMENTS

Figure 1:
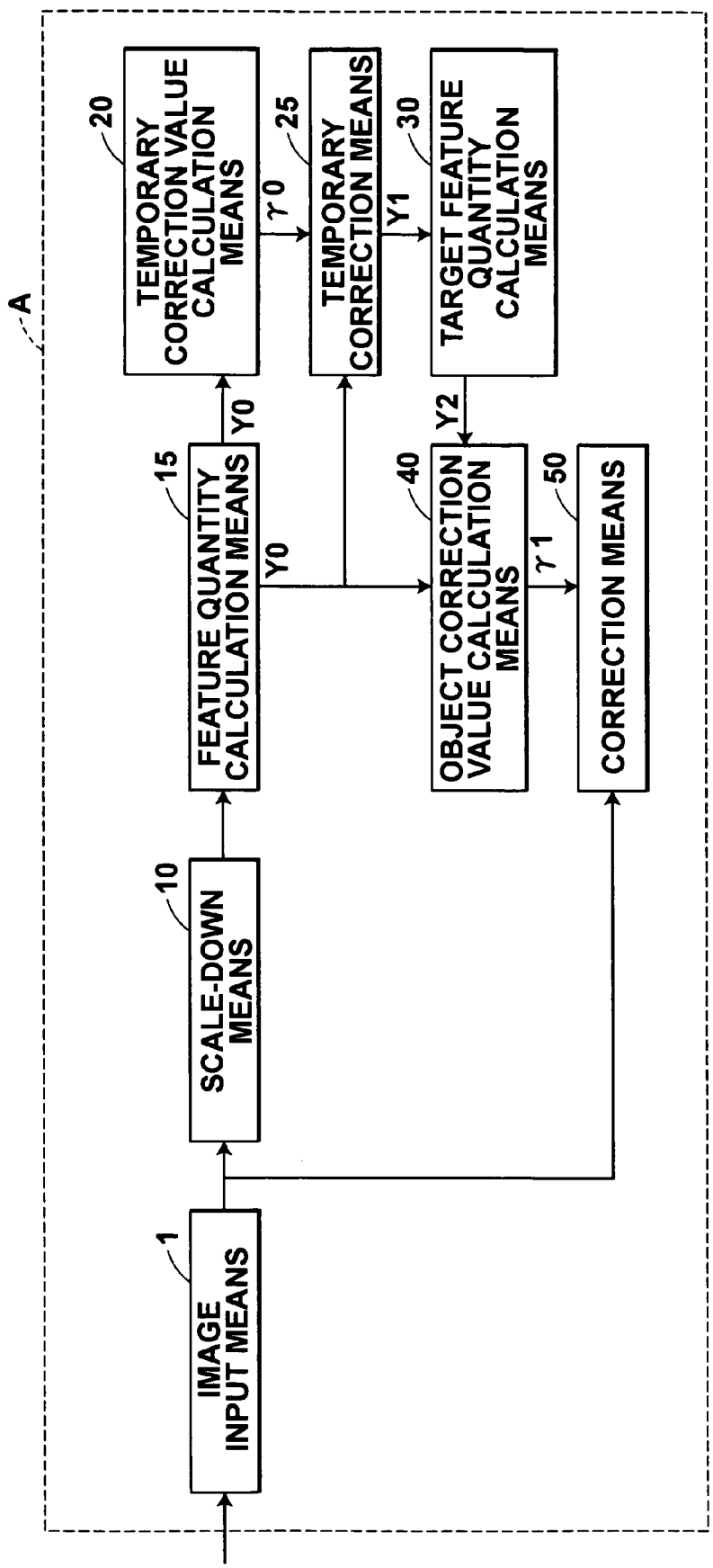
FIG. 1 is a block diagram showing an image processing system constructed in accordance with a first embodiment of the present invention.

Referring initially to FIG. 1, there is shown an image processing system A constructed in accordance with a first embodiment of the present invention. The image processing system A shown in the figure can be realized by executing an image processing program read in an auxiliary storage, with a computer (e.g., a personal computer, etc.). The image processing program may be stored in an information storage medium such as a CD-ROM, etc., or may be distributed through a network such as the Internet, etc. This image processing program is to be installed in a computer. The image processing system A of the first embodiment can obtain moving images by being connected to a digital versatile disc (DVD) player, a computer, game equipment, or a digital video (DV) camera, or it can receive moving images distributed through a network such as the Internet or read out moving images from a recording medium such as a DVD. As previously described, various corrections for image quality can be performed on digital images, but the image processing system A of the first embodiment corrects the exposure of a digital image, by way of example.

As shown in FIG. 1, the image processing system A of the first embodiment has eight major parts: (1) image input means 1 for acquiring a plurality of picture frames constituting a moving image; (2) scale-down means 10 for scaling down a picture frame and obtaining a thumbnail frame image; (3) feature quantity calculation means 15 for calculating a feature quantity of a thumbnail frame image, (4) temporary correction value calculation means 20 for calculating a temporary correction value using the feature quantity calculated by the feature quantity calculation means 15; (5) temporary correction means 25 for calculating a feature quantity of a temporarily corrected thumbnail frame image obtained by correcting a thumbnail frame image, using the temporary correction value calculated by the temporary correction value calculation means 20; (6) target feature quantity calculation means 30 for calculating a target feature quantity of each thumbnail frame image using the feature quantity calculated by the temporary correction means 25; (7) object correction value calculation means 40 for calculating an object correction value for each picture frame so that the feature quantity calculated by the feature quantity calculation means 15 becomes the target feature quantity calculated by the target feature quantity calculation means 30; and (8) correction means 50 for obtaining a corrected moving image by correcting each picture frame, using the object correction value calculated by the object correction value calculation means 40.

Figure 2:
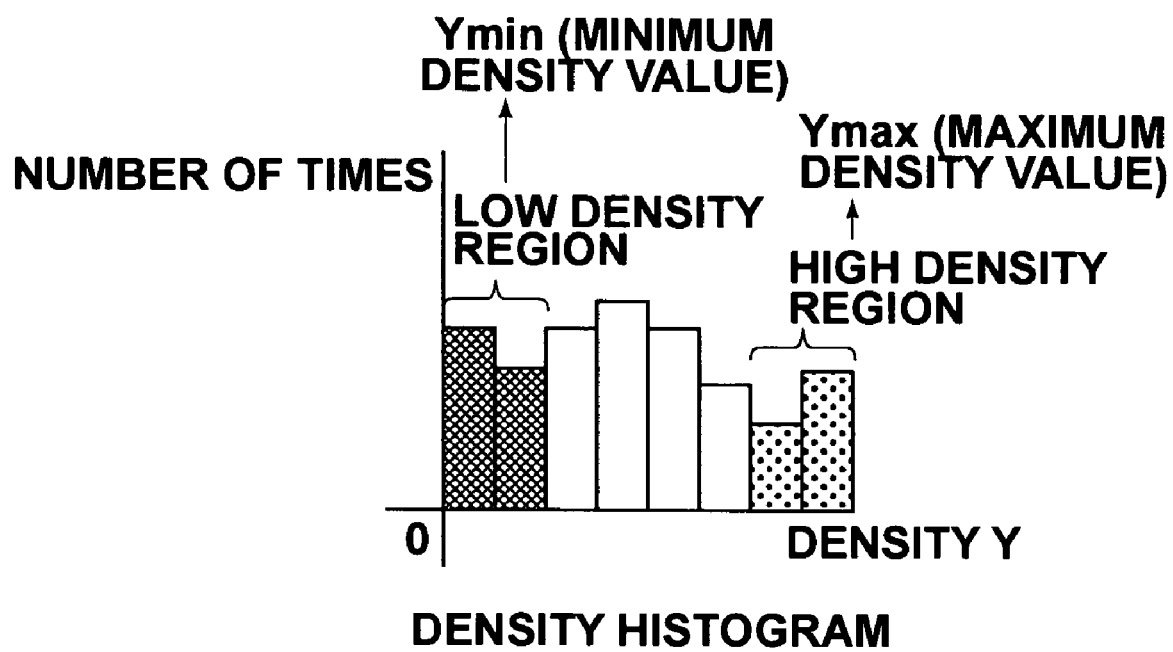
FIG. 2 is a diagram used to explain the feature quantity of a picture frame.

The feature quantity calculation means 15 makes a density histogram, shown in FIG. 2, for a thumbnail frame image acquired by the scale-down means 10 and calculates the mean value Y0 of the histogram by the following Eq. (1):

$$Y0=(Y_{min}+Y_{max})/2 \quad (1)$$

where $Y_{max}$ is the $m^{th}$ density value from the higher density Y, $Y_{min}$ is the $M^{th}$ density value from the lower density Y, and m is α times the number of pixels of a thumbnail frame image.

The temporary correction value calculation means 20 calculates a correction value γ0 for making a correction of exposure on a thumbnail frame image, according to the following Eq. (2), using the aforementioned mean value Y0 which is the feature quantity of a thumbnail frame image.

$$\gamma 0 = Yd - Y0 \quad (2)$$

where Yd is the target density. For example, the target density may be determined by estimating from the information about the skin region of a person being under a standard light source. It may also be calculated using methods disclosed in Japanese Unexamined Patent Publication Nos. 2000-101860 and 2000-196890.

The temporary correction value calculation means 20 outputs the aforementioned correction value γ0 to the temporary correction means 25 as a temporary correction value for a thumbnail frame image. A light line in FIG. 3B indicates a temporary correction value γ0 for each thumbnail frame image calculated by the temporary correction value calculation means 20.

The temporary correction means 25 calculates a feature quantity Y1 of a temporarily corrected thumbnail frame image obtained by correcting a thumbnail frame image with the temporary correction value γ0, according to the following Eq. (3), using the temporary correction value γ0 obtained by the temporary correction value calculation means 20 and the feature quantity Y0 obtained by the feature quantity calculation means 15.

$$Y1 = Y0 + \gamma 0 \quad (3)$$

where

Y1=feature quantity after temporary correction,
Y0=feature quantity before temporary correction,
γ0=temporary correction value.

Here, in order to achieve speedup of processing, the feature quantity Y1 of a temporarily corrected thumbnail frame image is directly calculated without making a temporary correction on a thumbnail frame image, but after a temporarily corrected thumbnail frame image is obtained by making a temporary correction on a thumbnail frame image, the feature quantity Y1 of the temporarily corrected thumbnail frame image may be calculated. More specifically, after a correction of exposure is performed on a thumbnail frame image according to the following Eq. (4), a temporarily corrected thumbnail frame image is obtained.

$$Y' = y + \gamma 0 \quad (4)$$

where

Y1'=density value after temporary correction,
Y0=density value before temporary correction,
γ0=temporary correction value.

And for the temporarily corrected thumbnail frame image, the mean value of the density histogram is calculated, as with the feature quantity calculation means 15. The calculated mean value can be used as the feature quantity Y1 of the temporarily corrected thumbnail frame image.

Figure 3A:
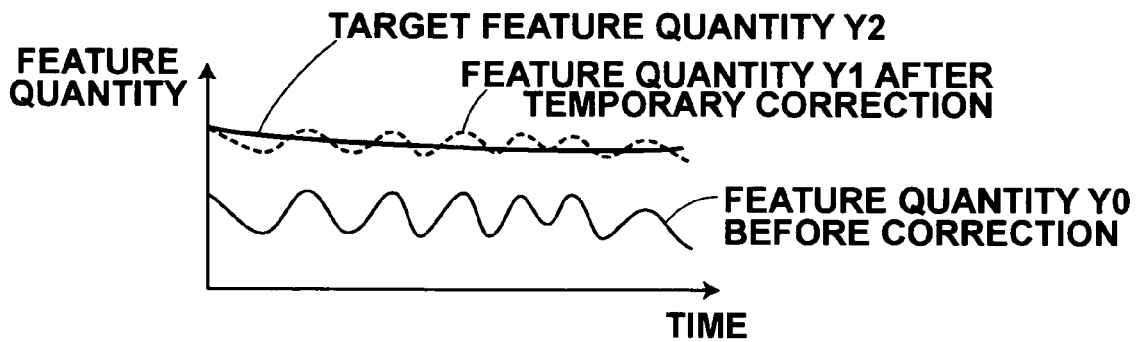
FIGS. 3A, 3B, and 3C, is a diagram used to explain operation of the image processing system shown in FIG. 1.

A broken line in FIG. 3A indicates the feature quantity Y1 of each temporarily corrected thumbnail frame image calculated by the temporary correction means 25. As shown in the figure, the feature quantities Y1 of temporarily corrected thumbnail images vary greatly in the temporal direction. If a moving image comprising such picture frames is reproduced, the flickering of the moving image will occur.

The target feature quantity calculation means 30 is used to obtain a target feature quantity by adjusting the feature quantities of the temporarily corrected thumbnail images so that the feature quantities vary smoothly in the temporal direction. In this embodiment, the average of the feature quantity of one temporarily corrected thumbnail frame image and the feature quantities of the two temporarily corrected thumbnail images before and after the one thumbnail frame image is taken and the average value is calculated as the target feature quantity Y2 of a thumbnail frame image to which the one temporarily corrected thumbnail frame image corresponds. In this embodiment, while the two temporarily corrected thumbnail images before and after one thumbnail frame image are employed, four or more temporarily corrected thumbnail images before and after one thumbnail frame image may be employed. A heavy line in FIG. 3A indicates the target feature quantity Y2 calculated for each thumbnail frame image by the target feature quantity calculation means 30. As shown in the figure, the target feature quantities Y2 are adjusted to vary smoothly in the temporal direction.

The object correction value calculation means 40 calculates a correction value γ1 according to the following Eq. (5) so that the feature quantity Y0 of a thumbnail frame image calculated by the feature quantity calculation means 15 becomes the target feature quantity Y2 calculated by the target feature quantity calculation means 30, and outputs this correction value γ1 to the correction means 50 as an object correction value for a picture frame.

$$\gamma 1 = Y2 - Y0 \quad (5)$$

where

Y0=feature quantity before correction,
Y2=target feature quantity,
γ1=object correction value.

Figure 3B:
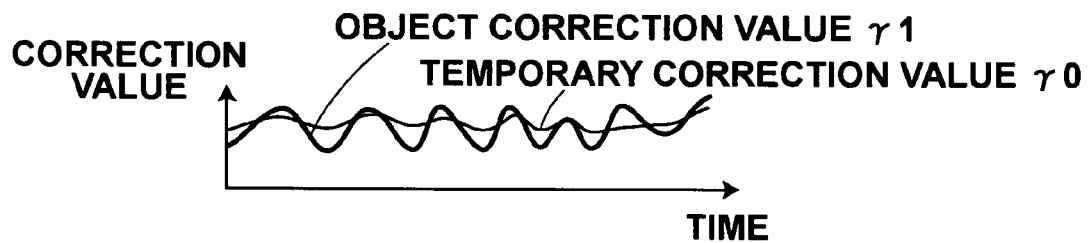

A heavy line in FIG. 3B indicates the object correction value γ1 calculated for each thumbnail frame image by the object correction value calculation means 40.

The correction means 50 obtains a corrected moving image by making a correction on each picture frame obtained by the image input means 1, according to the following Eq. (6), using the object correction value γ1.

$$YY = Y + \gamma 1 \quad (6)$$

where

YY=density value after correction,
Y0=density value before correction,
γ1=object correction value.

Figure 3C:
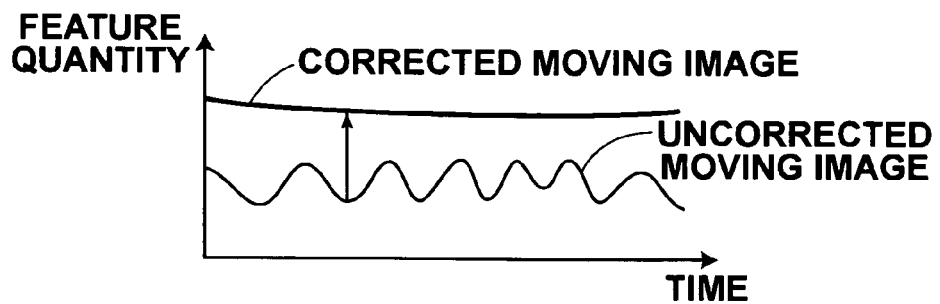

FIG. 3C shows the result of corrections made by the image processing system A of the first embodiment. A light line in the figure indicates the feature quantities of the picture frames of an uncorrected moving image, while a heavy line indicates the feature quantities of the picture frames of a corrected moving image. As shown in the figure, according to the image processing system A of the first embodiment, a moving image, in which fluctuations in the feature quantities of the picture frames are not slight in the temporal direction, is corrected so that the feature quantities of the picture frames of a corrected moving image vary smoothly. Therefore, the flickering of a corrected moving image can be reliably prevented.

Now, processing steps performed in the image processing system A of the first embodiment will be described in reference to FIG. 4. The processing steps shown in the figure are performed on a single picture frame constituting a moving image. Therefore, the image processing system A of the first embodiment performs the processing steps shown in FIG. 4 on each of the picture frames of a moving image and obtains a corrected moving image.

Figure 4:
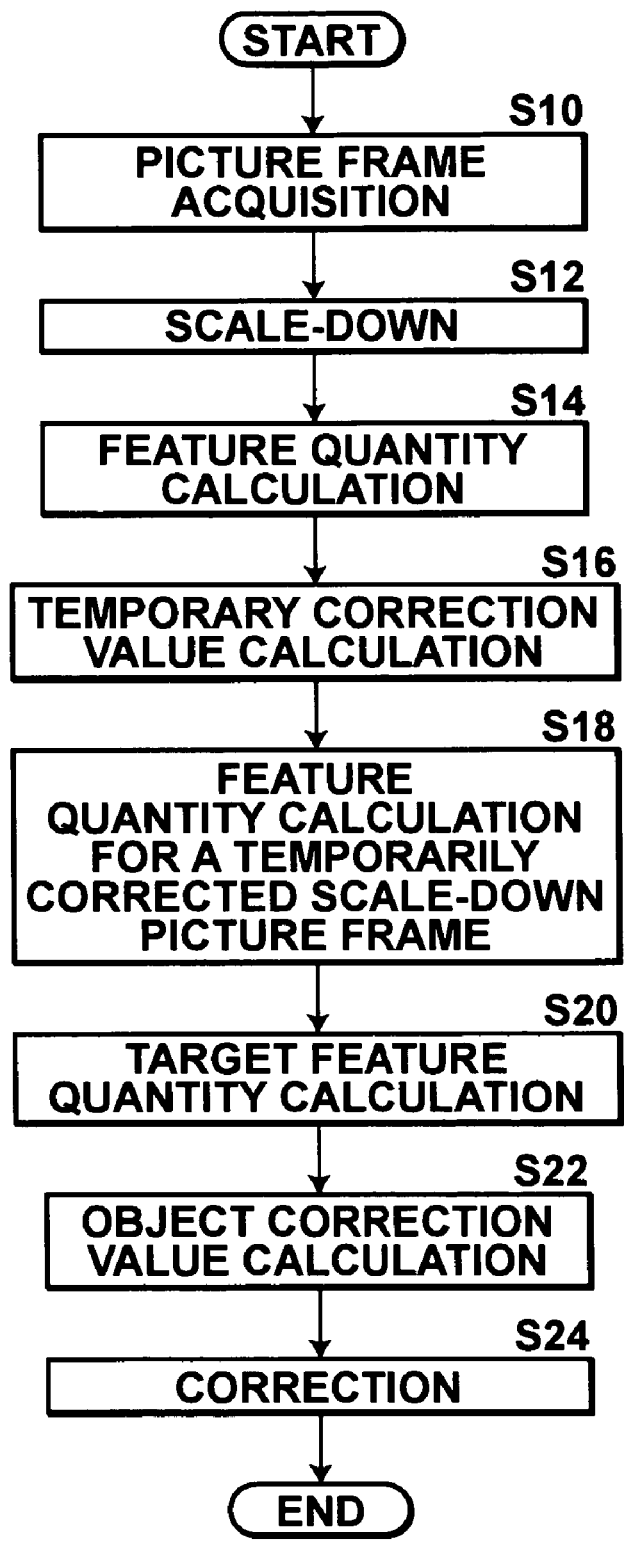
FIG. 4 is a flowchart showing processing steps performed in the image processing system shown in FIG. 1.

As shown in FIG. 4, a picture frame obtained by the image input means 1 is scaled down by the scale-down means 10 and is obtained as a thumbnail frame image (S10 and S12). The feature quantity calculation means 15 calculates a feature quantity Y0 from this thumbnail frame image (S14). The temporary correction value calculation means 20 calculates a temporary correction value γ0 for exposure correction, based on the calculated feature quantity Y0 (S16). The temporary correction means 25 calculates a feature quantity Y1 of a temporarily corrected thumbnail frame image, using the temporary correction value γ0 calculated in step S16 and the feature quantity Y0 calculated in step S14 (S18). The target feature quantity calculation means 30 takes the average of the feature quantity of this temporarily corrected thumbnail frame image and the feature quantities of the two temporarily corrected thumbnail images before and after this temporarily corrected thumbnail frame image, and uses the average as a target feature quantity Y2 of this temporarily corrected thumbnail frame image (S20). The object correction value calculation means 40 calculates an object correction value y1 so that the feature quantity Y0 calculated in step S14 becomes the target feature quantity Y2 calculated in step S20 (S22). The correction means 50 corrects the picture frame obtained by the image input means 1, using the object correction value γ1 (S24).

Figure 5:
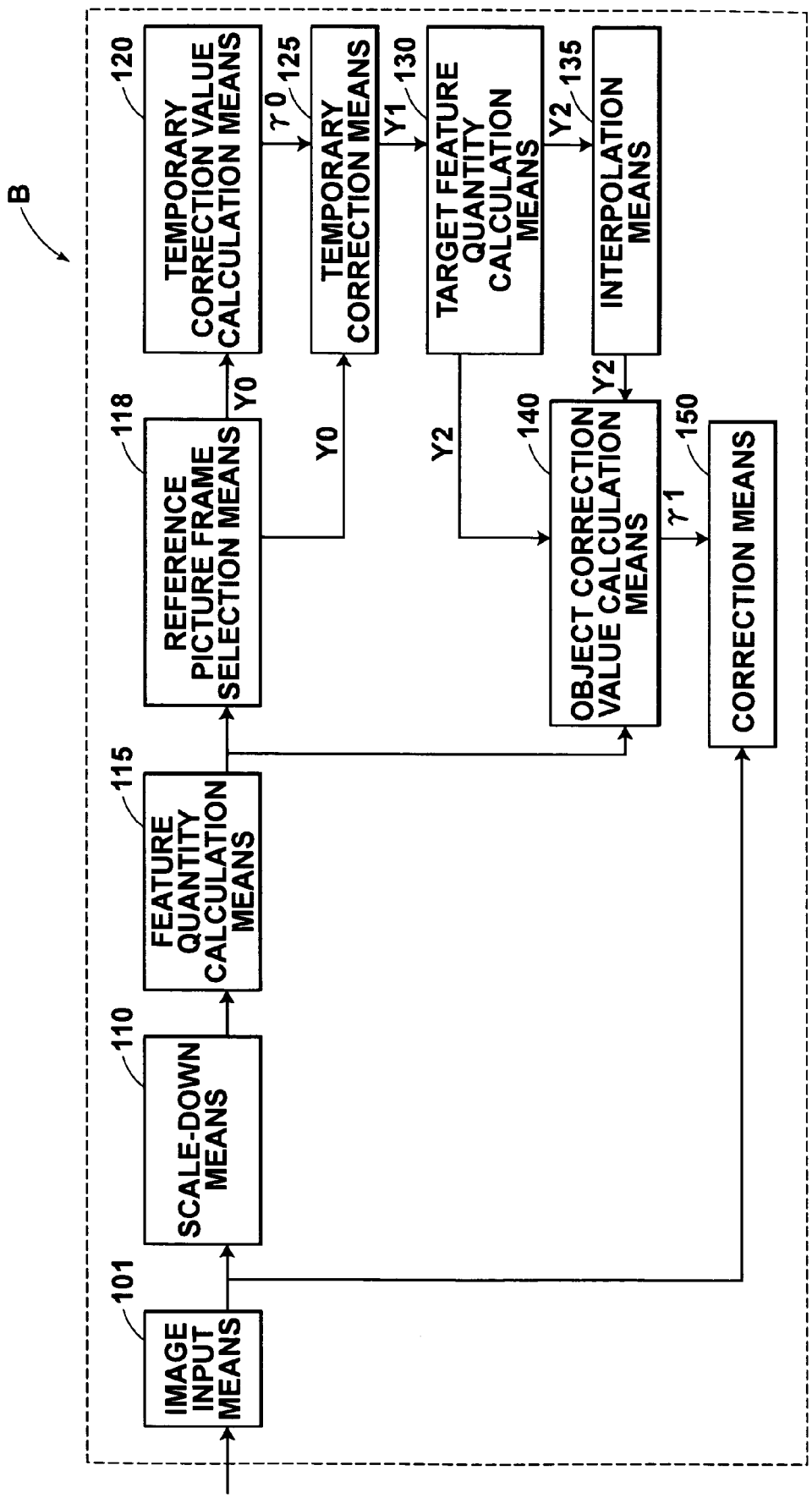
FIG. 5 is a block diagram showing an image processing system constructed in accordance with a second embodiment of the present invention.

Referring to FIG. 5, there is shown an image processing system B constructed in accordance with a second embodiment of the present invention. As shown in the figure, the image processing system B of the second embodiment has ten major parts: (1) image input means 101 for acquiring a plurality of picture frames constituting a moving image; (2) scale-down means 110 for scaling down a picture frame and obtaining a thumbnail frame image; (3) feature quantity calculation means 115 for calculating a feature quantity of a thumbnail frame image; (4) reference picture frame selection means 118 for selecting reference picture frames from the picture frames of the moving image; (5) temporary correction value calculation means 120 for calculating a temporary correction value, using the feature quantity of the thumbnail frame image corresponding to the selected reference picture frame output from the reference picture frame selection means 118; (6) temporary correction means 25 for calculating a feature quantity of a temporarily corrected thumbnail frame image obtained by correcting a thumbnail frame image, using the temporary correction value calculated by the temporary correction value calculation means 120; (7) target feature quantity calculation means 130 for calculating a target feature quantity of each reference picture frame using the feature quantity calculated by the temporary correction means 25; (8) interpolation means 135 for calculating a target feature quantity of each of the picture frames other than the reference picture frames by performing an interpolation process on the target feature quantity of each reference picture frame calculated by the target feature quantity calculation means 130; (9) object correction value calculation means 140 for calculating an object correction value for each picture frame so that the feature quantity calculated by the feature quantity calculation means 115 becomes the target feature quantity calculated by the target feature quantity calculation means 130 or interpolation means 135; and (10) correction means 150 for obtaining a corrected moving image by correcting each picture frame, using the object correction value calculated by the object correction value calculation means 140.

Figure 6:
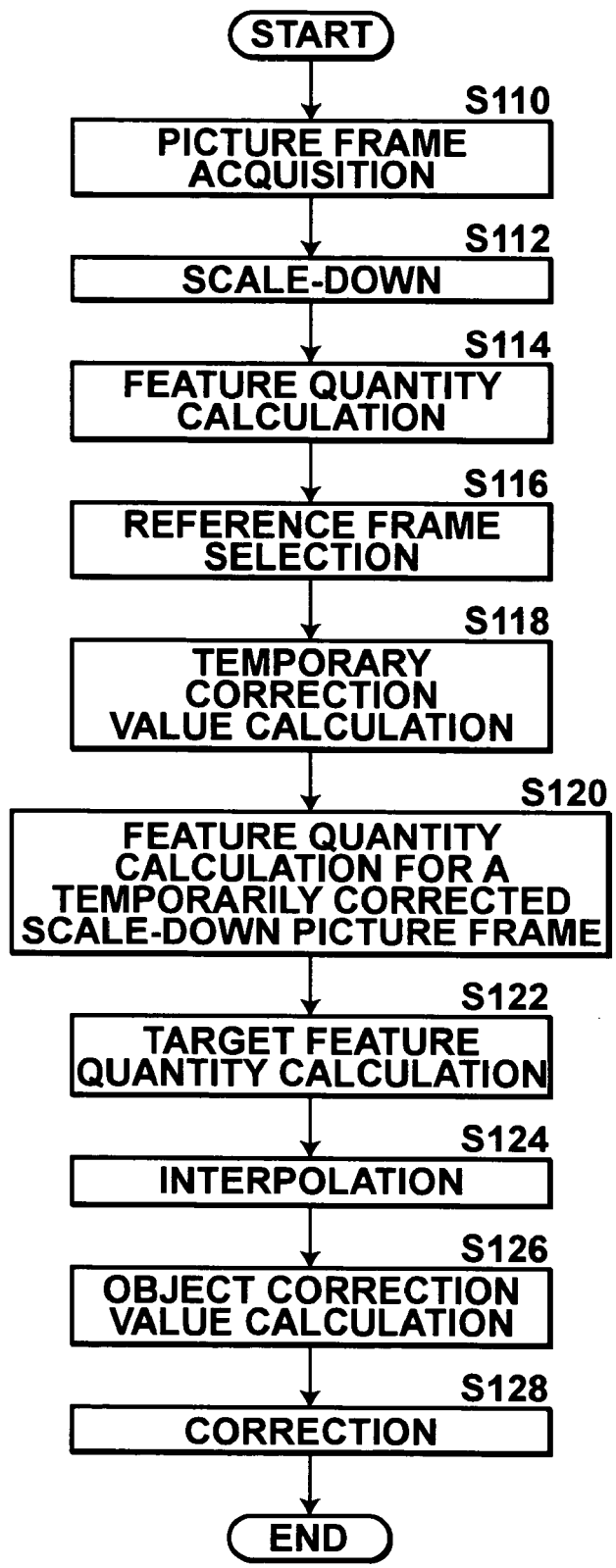
FIG. 6 is a flowchart showing processing steps performed in the image processing system shown in FIG. 5.

Instead of performing, on each of the picture frames of a moving image, the calculation of a temporary correction value, calculation of a feature quantity of a temporarily corrected thumbnail frame image, and calculation of a target feature quantity, the image processing system B of the second embodiment performs the aforementioned processing steps only on each of the reference picture frames selected by reference picture frame selection means 118 and obtains the target feature quantity of the reference picture frame, and performs an interpolation process on the target feature quantity of each reference picture frame by interpolation means 135 and obtains the target feature quantities of picture frames other than the reference picture frames. In this manner, the target feature quantity of each picture frame constituting a moving image is obtained. Furthermore, the calculation of the target feature quantity of a reference picture frame by target feature quantity calculation means 130 differs from the image processing system A of the first embodiment shown in FIG. 1. The remaining construction is the same as the image processing system A of the first embodiment. Here, processing steps performed in the image processing system B of the second embodiment will be described in reference to FIG. 6.

In the image processing system B, as shown in the figure, a picture frame obtained by the image input means 101 is scaled down by the scale-down means 110 and is obtained as a thumbnail frame image (S110 and S112). The feature quantity calculation means 115 calculates a feature quantity Y0 from each picture frame (S114). The reference picture frame selection means 118 first determines reference picture frames from the picture frames of the moving image. In the second embodiment, the reference picture frame selection means 118 selects reference picture frames by calculating the similarity, in the temporal direction, between picture frames and determining the interval between reference picture frames. The similarity can employ the correlation between picture frames. For example, the similarity can be made higher as the correlation becomes greater. If the determined interval between reference picture frames is n (where n is an integer ≧2), the first picture frame, the $(n+1)^{st}$ picture frame, the $(2n+1)^{st}$ picture frame, the $(3n+1)^{st}$ picture frame, . . . are selected from the picture frames of a moving image as reference picture frames. And the reference picture frame selection means 118 outputs only the feature quantity Y0 of the thumbnail frame image corresponding to each of the selected reference picture frames, to the temporary correction value calculation means 120 (S116). The temporary correction value calculation means 120 calculates a temporary correction value γ0 for exposure correction, based on the feature quantity Y0 of the reference picture frame output from the reference picture frame selection means 118 (S118). The temporary correction means 125 calculates a feature quantity Y1 of a temporarily corrected thumbnail frame image corresponding to the reference picture frame, using the temporary correction value γ0 and the feature quantity Y0 (S120). The target feature quantity calculation means 130 obtains a value by smoothing the variation in the temporal direction of the feature quantities of temporarily corrected thumbnail images corresponding to the reference picture frames with a low-pass filter, and uses the obtained value as a target feature quantity Y2 of the reference picture frame (S122). The interpolation means 135 acquires a target feature quantity of a picture frame other than a reference picture frame by performing an interpolation process on the target feature quantity Y2 of the reference picture frame in the temporal direction (S124). In this embodiment, while the interpolation process employs spline interpolation, it may employ linear interpolation and other interpolations.

Depending on whether or not a picture frame is a reference picture frame, the object correction value calculation means 140 calculates an object correction value γ1 so that the feature quantity Y0 calculated in step S114 becomes the target feature quantity Y2 of the reference picture frame calculated in step S120 or feature quantity Y2 of the picture frame other than the reference picture frame calculated in step S124 (S126). The correction means 150 obtains a corrected moving image by corrects each picture frame obtained by the image input means 101, using the object correction value γ1 (S128).

Thus, the image processing system B of the second embodiment can possess the same advantages as the image processing system A of the first embodiment shown in FIG. 1. In addition to these advantages, speedup of processing can be achieved, because processing steps, such as the calculation of temporary correction values, calculation of feature quantities of temporarily corrected thumbnail images, etc., are performed only on reference picture frames.

In the aforementioned two embodiments, while the processing steps from the calculation of feature quantities to the calculation of object correction values are performed on thumbnail images to achieve speedup of processing, these processing steps may be performed directly on original picture frames without scaling down them. Also, in scaling down picture frames, the scaled-down ratio may be adjusted in dependence on the required processing time or the resolution of original picture frames.

In the image processing system A, a target feature quantity is calculated by taking the moving average of the feature quantities of temporarily corrected picture frames. Also, in the image processing system B, a target feature quantity is calculated by passing the feature quantities of temporarily corrected picture frames through a low-pass filter. However, the image processing method and system of the present invention may obtain a target feature quantity by adjusting the feature quantity of a temporarily corrected picture frame by any method that can cause the feature quantities of temporarily corrected picture frames to vary smoothly in the temporal direction.

The aforementioned image processing systems A and B employ the mean value Y0 of a density histogram as the feature quantity of a picture frame, but may employ a representative value, such as an average, a median, etc., of densities within a picture frame, as the feature quantity.

The present invention may employ luminance instead of the density employed in the aforementioned two embodiments.

The aforementioned image processing systems A and B perform a correction of exposure on a moving image. However, the image processing method and system of the present invention are applicable not only to exposure correction, but also to other image quality corrections, such as the aforementioned white balance correction, color saturation correction, contrast correction, sharpness correction, color correction, a combination of these corrections, etc.

The aforementioned image processing systems A and B perform the processing steps up to correction on picture frames, employing object correction values. However, an original moving image, along with object correction values, maybe stored on a data storage medium or transmitted to processing systems provided on networks, without carrying out corrections, and corrections may be made when instructed.

Also, by detecting the two cut points (first and last frames). of one scene that represent a switch from one scene to another in a moving image, and smoothing the feature quantities of temporarily corrected picture frames within the two adjacent cut points of the same scene, correction values for the picture frames near the cut points can be prevented from being influenced by the feature quantity of a picture frame of a different scene.

Figure 7:
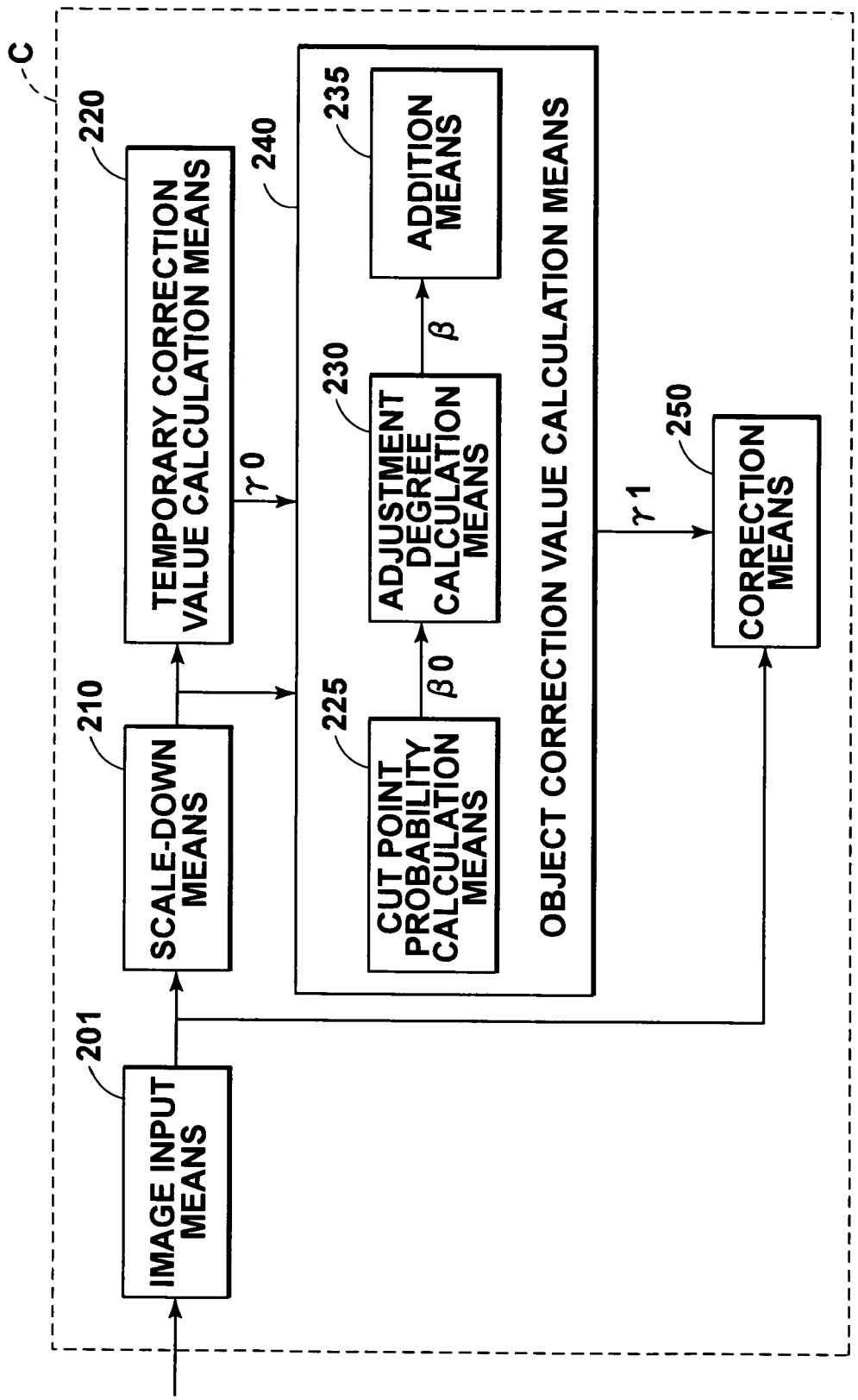
FIG. 7 is a block diagram showing an image processing system constructed in accordance with a third embodiment of the present invention.

Referring to FIG. 7, there is shown an image processing system C constructed in accordance with a third embodiment of the present invention. The image processing system C shown in the figure can be realized by executing an image processing program read in an auxiliary storage, with a computer (e.g., a personal computer, etc.). The image processing program may be stored in an information storage medium such as a CD-ROM, etc., or maybe distributed through a network such as the Internet, etc. This image processing program is to be installed in a computer. The image processing system C of the third embodiment can obtain moving images by being connected to a digital versatile disc (DVD) player, a computer, game equipment, or a digital video (DV) camera, or it can receive moving images distributed through a network such as the Internet or read out moving images from a recording medium such as a DVD. As previously described, various corrections for image quality can be performed on digital images, but the image processing system C of the third embodiment makes a correction of exposure on a digital image by way of example.

As shown in FIG. 7, the image processing system C of the third embodiment has five major parts: (1) image input means 201 for acquiring a plurality of picture frames constituting a moving image; (2) scale-down means 210 for scaling down a picture frame and obtaining a thumbnail frame image; (3) temporary correction value calculation means 220 for calculating a temporary correction value from the thumbnail frame image; (4) object correction value calculation means 240 for calculating an object correction value for a picture frame based on the temporary correction value calculated by the temporary correction value calculation means 220; and (5) correction means 250 for obtaining a corrected moving image by correcting each picture frame, using the object correction value calculated by the object correction value calculation means 240.

Figure 8:
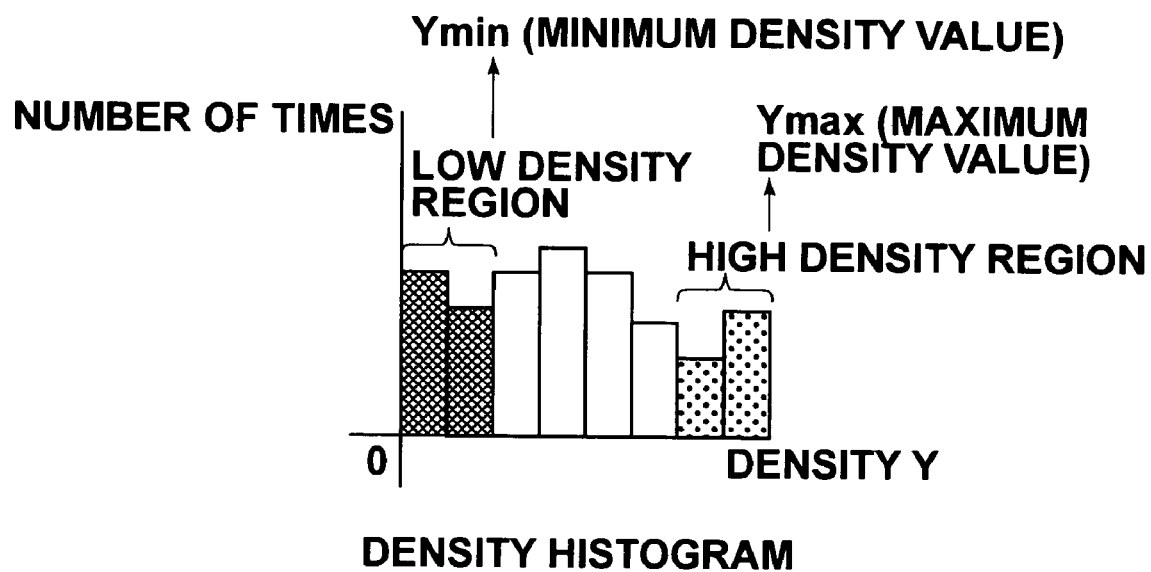
FIG. 8 is a diagram used to explain the feature quantity of a picture frame.

The temporary correction value calculation means 220 calculates a temporary correction value as follows. The temporary correction value calculation means 220 first makes a density histogram, shown in FIG. 8, for a thumbnail frame image acquired by the scale-down means 210 and calculates the mean value Y0 of the histogram by the following Eq. (7):

$$Y0=(Y_{min}+Y_{max})/2 \tag{7}$$

where $Y_{max}$ is the $m^{th}$ density value from the higher density Y, $Y_{min}$ is the $m^{th}$ density value from the lower density Y, and m is α times the number of pixels of a thumbnail frame image.

The temporary correction value calculation means 220 calculates a correction value γ0 for making a correction of exposure on a thumbnail frame image, according to the following Eq. (8), using the aforementioned mean value Y0.

$$\gamma 0 = Yd - Y0 \tag{8}$$

where Yd is the target density. For example, the target density may be determined by estimating from the information about the skin region of a person being under a standard light source. It may also be calculated using methods disclosed in Japanese Unexamined Patent Publication Nos. 2000-101860 and 2000-196890.

The temporary correction value calculation means 220 outputs the aforementioned correction value γ0 calculated for each picture frame, to the object correction value calculation means 240 as a temporary correction value for each picture frame.

The object correction value calculation means 240 calculates an object correction value γ1 by adjusting the temporary correction value γ0 for each picture frame so that the temporary correction values γ0 calculated by the temporary correction value calculation means 220 vary smoothly in the temporal direction. In this embodiment, the object correction value calculation means 240 adjusts a temporary correction value by the weighted addition of (1) a temporary correction value γ0 for a picture frame of interest and (2) the average value of temporary correction values γ0 for the picture frame of interest and the two picture frames before and after the picture frame of interest. However, a picture frame to be employed in the adjustment step may be only the picture frame before or after a picture frame of interest. The number of picture frames to be employed in the adjustment step may be increased or decreased. The method for adjusting temporary correction values is not limited to addition. For example, temporary correction values may be adjusted by passing them through a low-pass filter, or by a spline interpolation process.

As shown in FIG. 7, the object correction value calculation means 240 of the third embodiment has three major parts: (1) cut point probability calculation means 225 for calculating a cut point probability β0, which is the magnitude of a probability of a picture frame being a cut point representing a switch from one scene to another, for each picture frame; (2) adjustment degree calculation means 230 for calculating an adjustment degree β (which is to be described in detail later) for adjusting a temporary correction value γ0, in dependence on the cut point probability β0 calculated by the cut point probability calculation means 225; and (3) addition means 235 for obtaining an object correction value γ1 for a picture frame of interest by performing the weighted addition of (1) the temporary correction value γ0 for the picture frame of interest and (2) the average value of the temporary correction values γ0 for the picture frame of interest and the two picture frames before and after the picture frame of interest, using the temporary correction value γ0 and adjustment degree β.

The cut point probability calculation means 225 of the third embodiment calculates the cut point probability of each picture frame, based on the configuration of a histogram for the density values of a picture frame. More specifically, the cut point probability calculation means 225 first makes a histogram for the density values of the thumbnail frame image of each picture frame obtained by the scale-down means 210. FIG. 9A shows histograms for thumbnail images calculated by the cut point probability calculation means 225. (Shown in the figure are histograms for six successive picture frames f1, f2, f3, f4, f5, and f6.) There is a possibility that in obtaining a moving image by photographing a subject with an image pick-up device such as a digital video camera, a digital still camera capable of photographing moving images, etc., a difference in density having no connection with the subject will occur between picture frames, depending on the operating performance of the image pick-up device used. Therefore, in order to eliminate a difference in density between picture frames resulting from the operating performance of an image pick-up device, the cut point probability calculation means 225 of the third embodiment further calculates a representative value of each picture frame (e.g., the average value of density values in this embodiment) and also performs histogram matching by moving the histograms of picture frames in parallel along the density value axis so that the representative values of the picture frames become approximately equal to one another. This processing eliminates a difference in density between picture frames resulting from the operating performance of an image pick-up device, and the result is as shown in FIG. 9B. The representative value of a picture frame may employ a median, dispersed values (maximum and minimum values), etc., in addition to the average value of density values employed in the third embodiment.

The cut point probability calculation means 225 obtains an average configuration by taking the average of the configurations of the two picture frames (or four or more picture frames) before and after a picture frame of interest, using matched histograms such as that shown in FIG. 9B. Then, the cut point probability calculation means 225 calculates a correlation between the configuration of the histogram for the picture frame of interest and the obtained average configuration. When the calculated correlation is a predetermined first threshold value or greater, the cut point probability of the picture frame of interest is set to 0 (minimum). When the correlation is a predetermined second threshold value (which is less than the first threshold value) or less, the cut point probability of the picture frame of interest is set to 1 (maximum). When the correlation is between the first threshold value and the second threshold value, the cut point probability is calculated between 0 and 1 so that it becomes smaller as the correlation becomes greater. FIG. 9C shows the cut point probabilities β0 calculated for the six successive picture frames shown in FIG. 9A.

The adjustment degree calculation means 230 calculates an adjustment degree β for adjusting a temporary correction value γ0, for each picture frame according to the following Eq. (9), using the cut point probability β0 calculated by the cut point probability calculation means 225.

$$\beta(i)=1-\beta0(i) \qquad (9)$$

where
β0=cut point probability,
β=adjustment degree.

The addition means 235 calculates an object correction value γ1 for a picture frame of interest according to the following Eq. (10), using the adjustment degree γ calculated by the adjustment degree calculation means 230 and the temporary correction value γ0 calculated by the temporary correction value calculation means 220.

$$\gamma1(i)=(1-\beta(i))\times\gamma0(i)+\beta(i)\times(\gamma0(i-1)+\gamma0(i)+\gamma0(i+1))/3 \qquad (10)$$

where
γ1(i)=object correction value for the picture frame of interest,
γ0(i)=temporary correction value for the picture frame of interest,
γ0(i−1)=temporary correction value for the picture frame before the picture frame of interest,
γ0(i+1)=temporary correction value for the picture frame after the picture frame of interest,
β(i)=adjustment degree for the picture frame of interest.

The object correction value calculation means 240 outputs the object correction value γ1 for each picture frame obtained by the addition means 235 to the correction means 250.

The correction means 250 obtains a corrected moving image by making a correction on each picture frame obtained by the image input means 201, according to the following Eq. (11), using the object correction value γ1.

$$YY = Y + \gamma 1 \quad (11)$$

where
- YY=density value after correction,
- Y0=density value before correction,
- γ1=object correction value.

Here, for purposes of making the subject matter of the present invention more understandable, the object correction value calculation means 240 calculates a cut point probability β0, calculates an adjustment degree β based on the cut point probability β0, and obtains an object correction value γ1 by adjusting a temporary correction value γ0, using the adjustment degree β. However, the object correction value calculation means 240 may calculate the object correction value γ1 directly by the following Eq. (12), using the cut point probability β0 without calculating the adjustment degree β.

$$\gamma 1(i) = \beta 0(i) \times \gamma 0(i) + (1 - \beta 0(i)) \times (\gamma 0(i-1) + \gamma 0(i) + \gamma 0(i+1))/3 \quad (12)$$

where
- γ1(i)=object correction value for the picture frame of interest,
- γ0(i)=temporary correction value for the picture frame of interest,
- γ0(i−1)=temporary correction value for the picture frame before the picture frame of interest,
- γ0(i+1)=temporary correction value for the picture frame after the picture frame of interest,
- β(i)=adjustment degree for the picture frame of interest.

Figure 10:
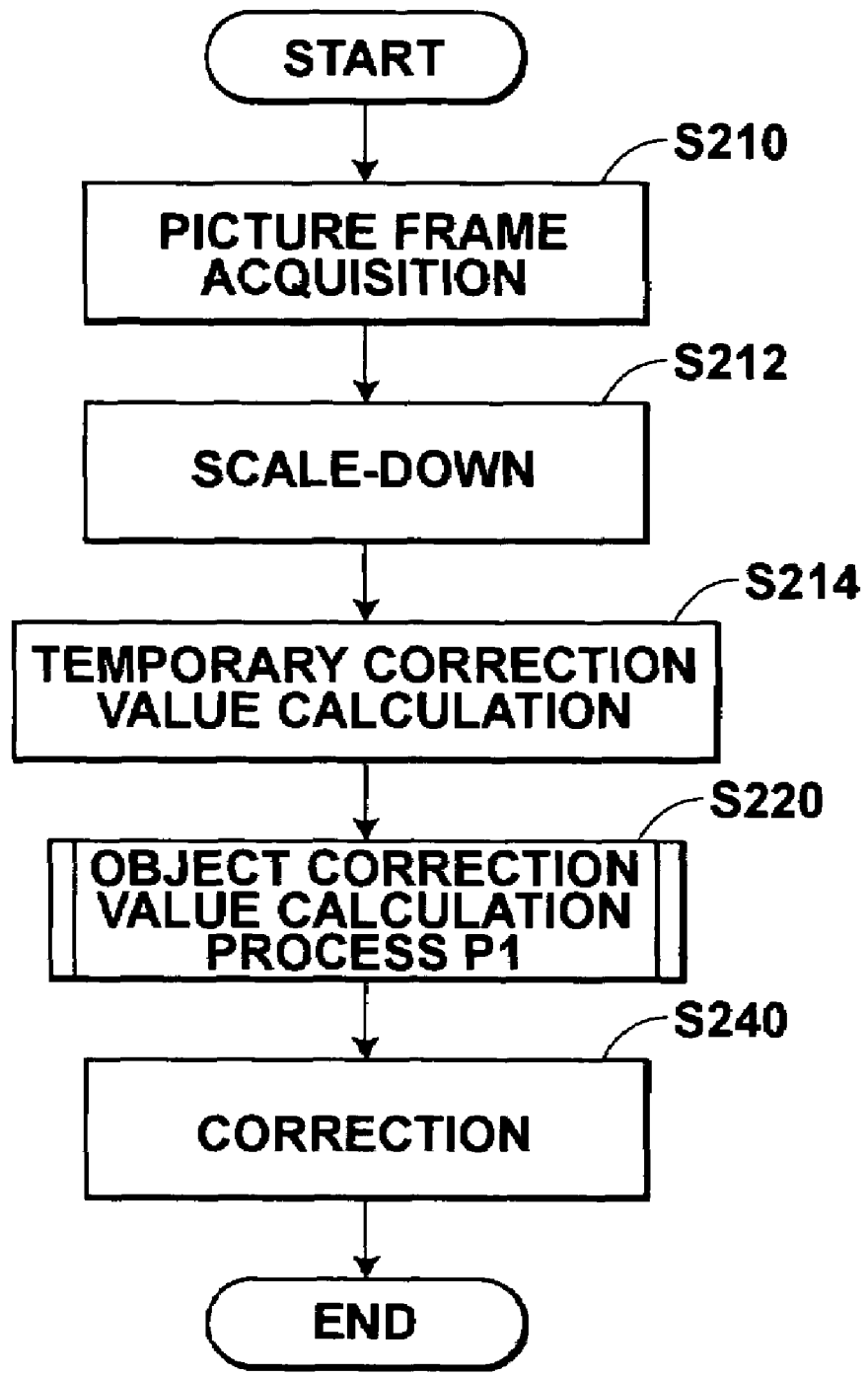
FIGS. 10 and 11 are flowcharts showing processing steps performed in the image processing system shown in FIG. 7.

FIG. 10 shows processing steps performed in the image processing system C of the third embodiment shown in FIG. 7. The processing steps shown in FIG. 10 are performed on a single picture frame constituting a moving image. Therefore, the image processing system C of the third embodiment performs the processing steps shown in FIG. 10 on each of the picture frames of a moving image and obtains a corrected moving image.

Figure 11:
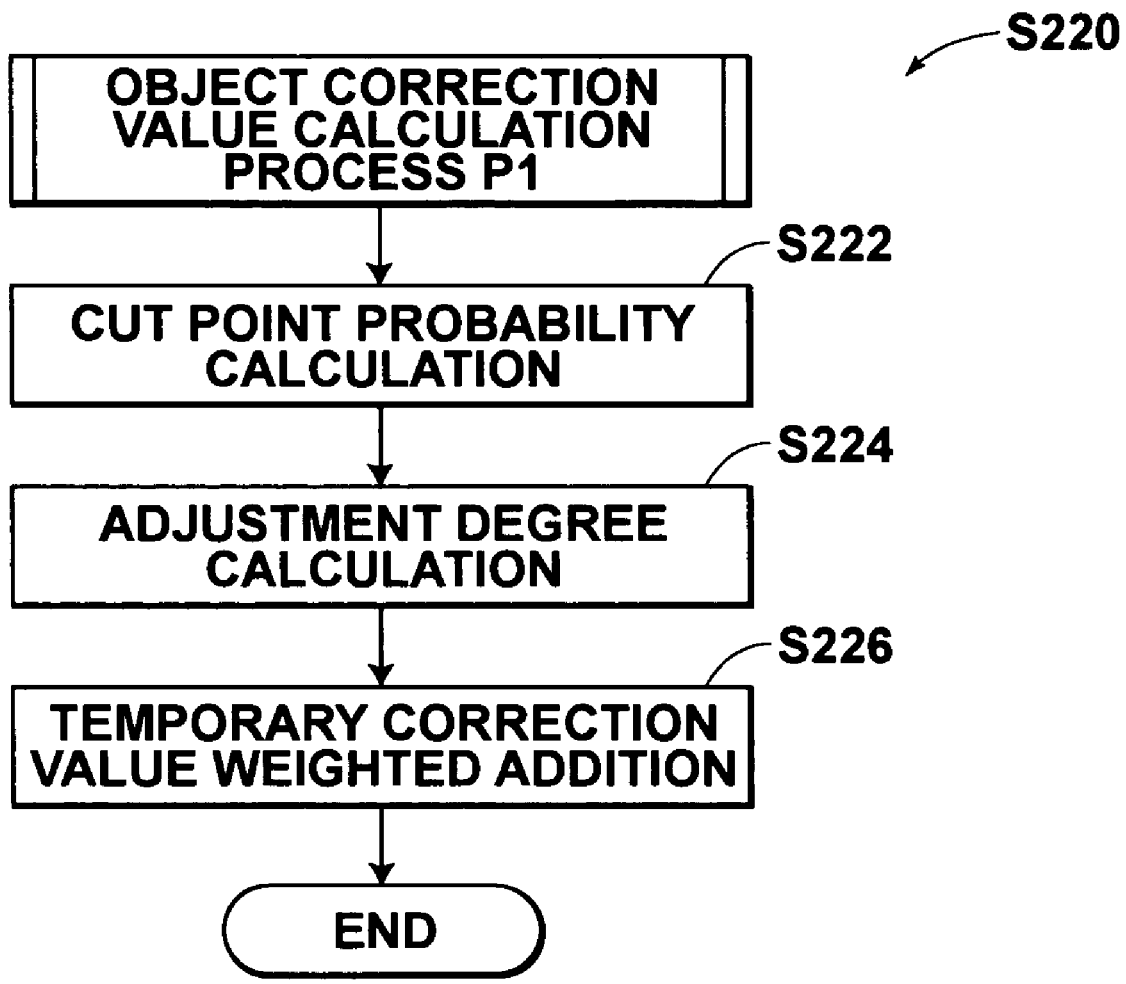

As shown in FIG. 10, a picture frame obtained by the image input means 201 is scaled down by the scale-down means 210 and is obtained as a thumbnail frame image (S210 and S212) The temporary correction value calculation means 220 calculates a temporary correction value γ0 for exposure correction from a thumbnail frame image (S214). The object correction value calculation means 240 calculates an object correction value γ1 by adjusting the temporary correction values γ0 for picture frames so that the temporary correction values γ0 vary smoothly in the temporal direction (S220). The correction means 250 corrects the picture frame obtained by the image input means 201, using the object correction value γ1 (S240). The object correction value calculation process P1 performed in step S220 by the object correction value calculation means 240 is shown in detail in FIG. 11. As shown in the figure, in the object correction value calculation means 240, the cut point probability calculation means 225 calculates a cut point probability β0 (S222). Then, the adjustment degree calculation means 230 calculates an adjustment degree β for a picture frame of interest, based on the cut point probability β0 (S224). And the addition means 235 calculates an object correction value γ1 for a picture frame of interest by performing the weighted addition of (1) the temporary correction value for the picture frame of interest and (2) the average value of the temporary correction values for the two picture frames before and after the picture frame of interest in such a way that the weight of the temporary correction value for the picture frame of interest becomes greater as the adjustment degree β becomes smaller (i.e., in such a way that the adjustment degree of the temporary correction value for the picture frame of interest becomes smaller as the cut point probability β0 becomes greater) (S226).

Thus, in order to correct each picture frame of a moving image and obtain a corrected moving image, the image processing system C of the third embodiment obtains an object correction value for a picture frame of interest in the following manner, according to the cut point probability of each picture frame, when obtaining the object correction value by adjusting temporary correction values, obtained for the picture frames of the moving image, so that the temporary correction values vary smoothly in the temporal direction. That is, an object correction value for a picture frame of interest is obtained by performing the weighted addition of (1) the temporary correction value for the picture frame of interest and (2) the average value of the temporary correction values for the two picture frames before and after the picture frame of interest in such a way that as the weight of the cut point probability of the picture frame of interest becomes greater, the weight of the temporary correction value for this picture frame becomes greater and the weight of the average value of the temporary correction values for the two picture frames before and after the picture frame of interest becomes smaller (i.e., the adjustment degree of the temporary correction value for the picture frame of interest becomes smaller). Therefore, an object correction value for a picture frame which becomes a cut point (picture frame whose cut point probability is 1) can be prevented from being influenced by the temporary correction values for the two picture frames before and after that picture frame. Thus, an appropriate correction value for a picture frame at a cut point can be calculated. In addition, an object correction value for a picture frame whose variation is small in the same scene (picture frame whose cut point probability is 0) is influenced by the temporary correction values for the two picture frames before and after that picture frame and varies smoothly in the temporal direction. Therefore, the flickering of a corrected moving image can be eliminated. Furthermore, in the case of a picture frame where a change in an image is great in the same scene (picture frame whose cut point probability is between 0 and 1), as shown in FIG. 19, the object correction value is influenced by the temporary correction values for the two picture frames before and after that picture frame, but the degree of influence is smaller than that of an ordinary picture frame. For that reason, a suitable correction can be made on even a picture frame where a change in an image is great in the same scene, while eliminating the flickering of a corrected moving image.

Figure 12:
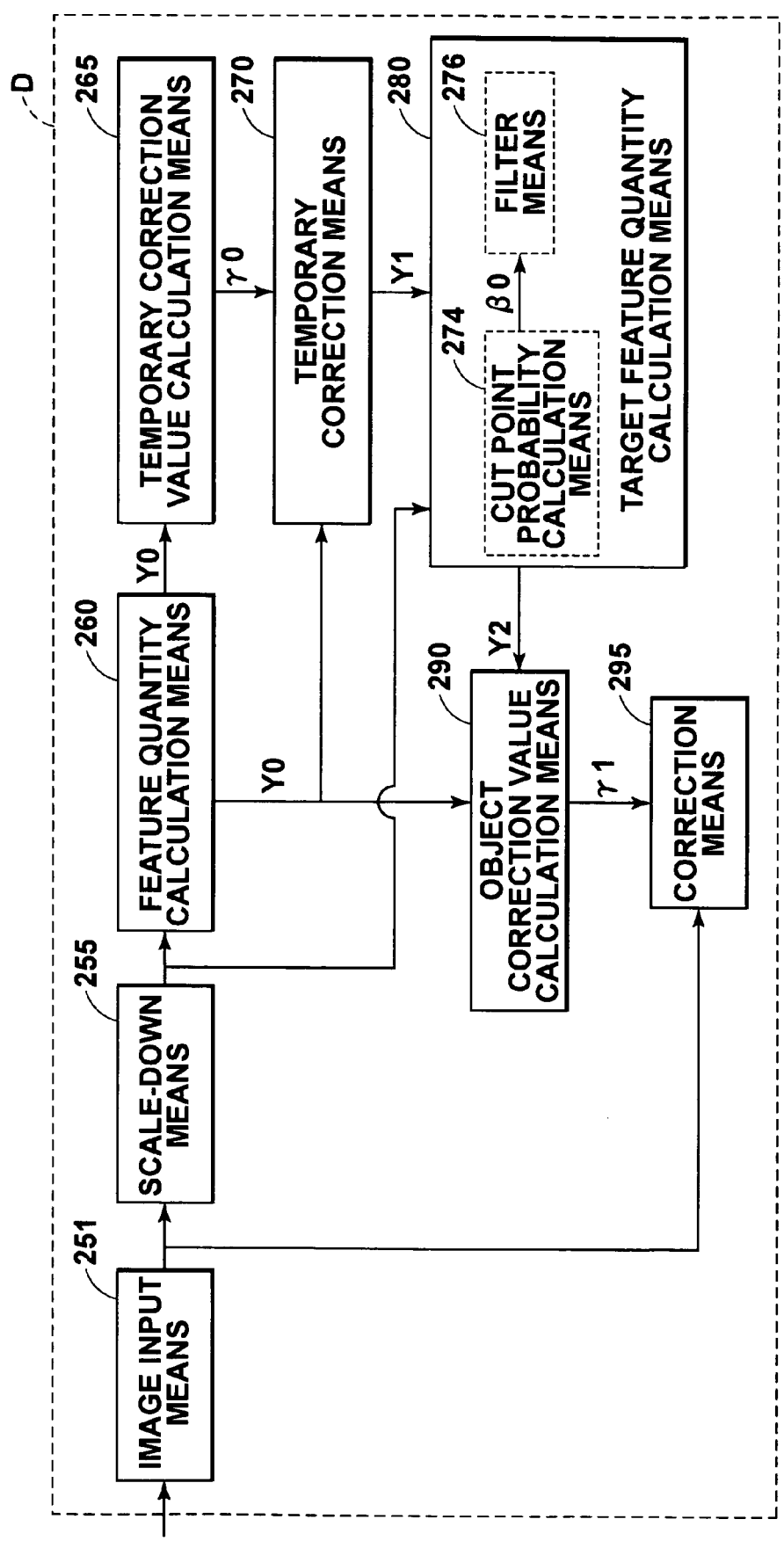
FIG. 12 is a block diagram showing an image processing system constructed in accordance with a fourth embodiment of the present invention.

Referring to FIG. 12, there is shown an image processing system D constructed in accordance with a fourth embodiment of the present invention. As shown in the figure, the image processing system D of the fourth embodiment has eight major parts: (1) image input means 251 for acquiring a plurality of picture frames constituting a moving image; (2) scale-down means 255 for scaling down a picture frame and obtaining a thumbnail frame image; (3) feature quantity calculation means 260 for calculating a feature quantity of a thumbnail frame image; (4) temporary correction value calculation means 265 for calculating a temporary correction value using the feature quantity calculated by the feature quantity calculation means 260; (5) temporary correction means 270 for calculating a feature quantity of a temporarily corrected thumbnail frame image obtained by correcting a thumbnail frame image, using the temporary correction value calculated by the temporary correction value calculation means 265; (6) target feature quantity calculation means 280 for calculating a target feature quantity of each thumbnail frame image using the feature quantity calculated by the temporary correction means 270; (7) object correction value calculation means 290 for calculating an object correction value for each picture frame so that the feature quantity calculated by the feature quantity calculation means 260 becomes the target feature quantity calculated by the target feature quantity calculation means 280; and (8) correction means 295 for obtaining a corrected moving image by correcting each picture frame, using the object correction value calculated by the object correction value calculation means 290.

The feature quantity calculation means 260 and temporary correction value calculation means 265 are equivalent to the temporary correction value calculation means 220 of the image processing system C shown in FIG. 7 and, as with the temporary correction value calculation means 220 of the image processing system C, calculate a feature quantity Y0 for a thumbnail frame image and calculate a correction value γ0 for making a correction of exposure on the thumbnail frame image in dependence on this feature quantity Y0. Here, a detailed description thereof is omitted. Note that a light line in the lower portion of FIG. 14A indicates the feature quantities Y0 calculated by the feature quantity calculation means 260.

The temporary correction value calculation means 265 outputs the aforementioned correction value γ0 to the temporary correction means 270 as a temporary correction value for a thumbnail frame image.

The temporary correction means 270 calculates a feature quantity Y1 for a temporarily corrected thumbnail frame image obtained by correcting a thumbnail frame image with the temporary correction value γ0, according to the following Eq. (13), using the temporary correction value γ0 obtained by the temporary correction value calculation means 265 and the feature quantity Y0 obtained by the feature quantity calculation means 260.

$$Y1 = Y0 + \gamma 0 \qquad (13)$$

where
   Y1=feature quantity after temporary correction,
   Y0=feature quantity before temporary correction,
   γ0=temporary correction value.

Here, in order to achieve speedup of processing, the feature quantity Y1 for a temporarily corrected thumbnail frame image is directly calculated without making a temporary correction on a thumbnail frame image, but after a temporarily corrected thumbnail frame image is obtained by making a temporary correction on a thumbnail frame image, a feature quantity for the temporarily corrected thumbnail frame image may be calculated. More specifically, after a correction of exposure is performed on a thumbnail frame image according to the following Eq. (14), a temporarily corrected thumbnail frame image is obtained.

$$Y' = Y + \gamma 0 \qquad (14)$$

where
   Y'=density value after temporary correction,
   Y0=density value before temporary correction,
   γ0=temporary correction value.

And for the temporarily corrected thumbnail frame image, the mean value of the density histogram is calculated, as with the feature quantity calculation means 260. The calculated mean value can be used as the feature quantity Y1 of the temporarily corrected thumbnail frame image.

Figure 14A:
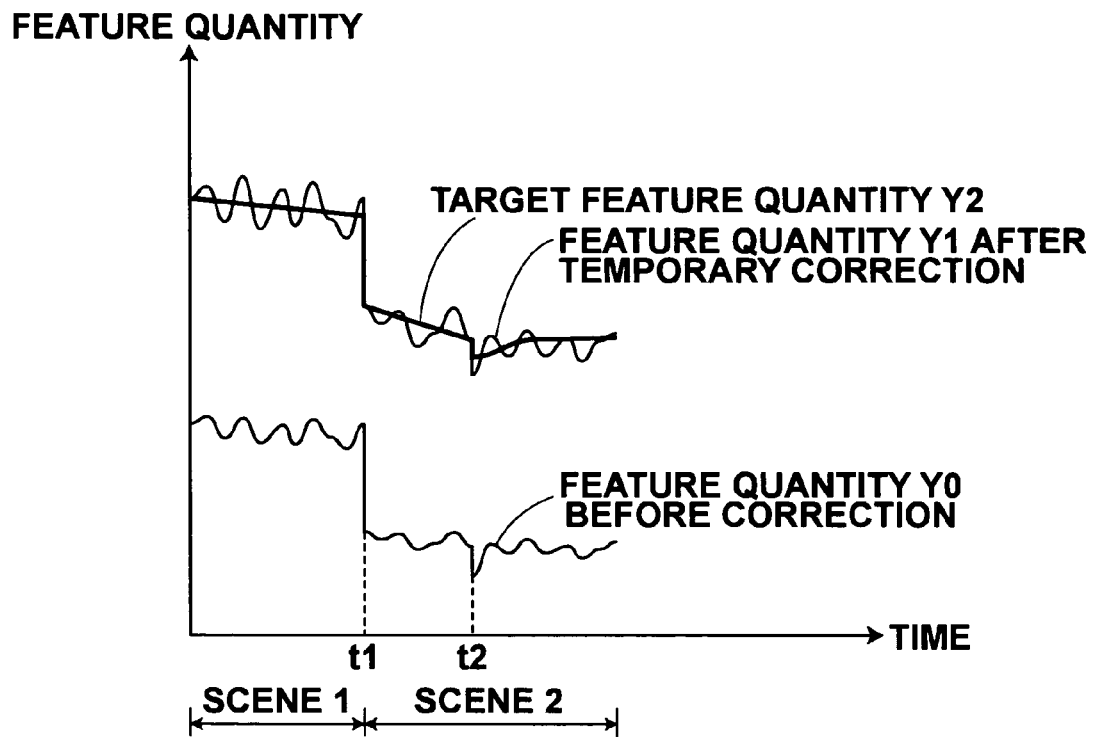
FIGS. 14A and 14B, is a diagram used to explain operation of the image processing system shown in FIG. 12.

A light line in the upper portion of FIG. 14A indicates the feature quantity Y1 of each temporarily corrected thumbnail frame image calculated by the temporary correction means 270. As shown in the figure, the feature quantities Y1 of temporarily corrected thumbnail images vary greatly in the temporal direction. If a moving image comprising such picture frames is reproduced, the flickering of the moving image will occur.

The target feature quantity calculation means 280 is used to obtain a target feature quantity by adjusting the feature quantities of the temporarily corrected thumbnail images so that the feature quantities vary smoothly in the temporal direction. In this embodiment, the target feature quantity calculation means 280 adjusts the feature quantity of a temporarily corrected thumbnail frame image of interest by performing a filter process (which is to be described in detail later) on the feature quantities Y1 of five temporarily corrected thumbnail images with the thumbnail frame image of interest as the center and calculates a target feature quantity Y2. As shown in FIG. 12, the target feature quantity calculation means 280 of the fourth embodiment comprises two major parts: (1) cut point probability calculation means 274 for calculating a cut point probability β0, which is the magnitude of a probability of a picture frame being a cut point representing a switch from one scene to another, for each picture frame and (2) filter means 276 for obtaining a target feature quantity Y2 for a temporarily corrected thumbnail frame image of interest by performing a filter process on the feature quantities Y1 of five temporarily corrected thumbnail images with the thumbnail frame image of interest as the center, with a filter determined in dependence on the cut point probability β0 calculated by the cut point probability calculation means 274.

The cut point probability calculation means 274 of the target feature quantity calculation means 280, as with the cut point probability calculation means 225 of the image processing system C shown in FIG. 7, calculates a cut point probability, based on the configuration of a histogram for the density values of a picture frame. Therefore, a detailed description of the cut point probability calculation means 274 is omitted. In the case of an example shown in FIG. 14A, a picture frame at time t1 is a cut point representing a switch from a scene 1 to a scene 2, and the cut point probability is 1. An image contained in a picture frame at time t2 fluctuates greatly in the scene 2, and the cut point probability is between 0 and 1.

Figure 13:
FIG. 13 is a diagram showing the relationship between cut point probabilities and filters.

The filter means 276 has a database (not shown) in which cut point probabilities β0 and filters F correspond to each other so the filters F can be used according to the cut point probabilities β0. FIG. 13 shows an example of the database. An arrow in the figure indicates a direction where the cut point probability β0 increases.

The filter means 276 detects a filter F corresponding to the cut point probability β0 calculated by the cut point probability calculation means 274, from the database shown in FIG. 13. The filter means 276 also calculates a target feature quantity Y2 according to the following Eq. (15), using the detected filter F and the feature quantity Y1 of a temporarily corrected thumbnail frame image calculated by the temporary correction means 270.

$$Y2(i) = F \times (Y1(i-2) + Y1(i-1) + Y1(i) + Y1(i+1) + Y1(i+2))/5 \qquad (15)$$

where
   Y2(i)=target feature quantity of a temporarily corrected thumbnail frame image of interest,
   Y1(i)=feature quantity of a temporarily corrected thumbnail frame image of interest,
   Y1(i−2)=feature quantity of the temporarily corrected thumbnail frame image of interest two before the temporarily corrected thumbnail frame image of interest, Y1(i−1)=feature quantity of the temporarily corrected thumbnail frame image of interest one before the temporarily corrected thumbnail frame image of interest, Y1(i+1)=feature quantity of the temporarily corrected thumbnail frame image of interest one after the temporarily corrected thumbnail frame image of interest, Y1(i+2)=feature quantity of the temporarily corrected thumbnail frame image of interest two after the temporarily corrected thumbnail frame image of interest, F=filter corresponding to the cut point probability.

As evident in the filters of FIG. 13 and Eq. (15), if the cut point probability β0 of a temporarily corrected thumbnail frame image of interest becomes greater, the influence on the target feature quantity Y2 by the feature quantities Y1 of the two temporarily corrected thumbnail images before and after the picture frame of interest becomes smaller. In the case of a temporarily corrected thumbnail frame image of interest whose cut point probability is 1, the target feature quantity Y2 is not influenced at all by the two picture frames before and after the picture frame of interest. On the other hand, if the cut point probability β0 of a temporarily corrected thumbnail frame image of interest becomes smaller, the influence on the target feature quantity Y2 by the feature quantities Y1 of the two temporarily corrected thumbnail images before and after the picture frame of interest becomes greater. In the case of a temporarily corrected thumbnail frame image of interest whose cut point probability is 0, the target feature quantity Y2 is the average value of the feature quantities Y1 of the four temporarily corrected thumbnail images before and after the picture frame of interest.

A heavy line in FIG. 14A indicates the target feature quantity Y2 calculated for each thumbnail frame image by the target feature quantity calculation means 280.

The object correction value calculation means 290 calculates a correction value γ1 according to the following Eq. (16) so that the feature quantity Y0 of a thumbnail frame image calculated by the feature quantity calculation means 260 becomes the target feature quantity Y2 calculated by the target feature quantity calculation means 280, and outputs this correction value γ1 to the correction means 295 as an object correction value for a picture frame.

$$\gamma1 = Y2 - Y0 \qquad (16)$$

where

Y0=feature quantity before correction,

Y2=target feature quantity,

γ1=object correction value.

The correction means 295 obtains a corrected moving image by making a correction on each picture frame obtained by the image input means 251, according to the following Eq. (17), using the aforementioned object correction value γ1.

$$YY = Y + \gamma1 \qquad (17)$$

where

YY=density value after correction,

Y0=density value before correction,

γ1=object correction value.

Figure 14B:
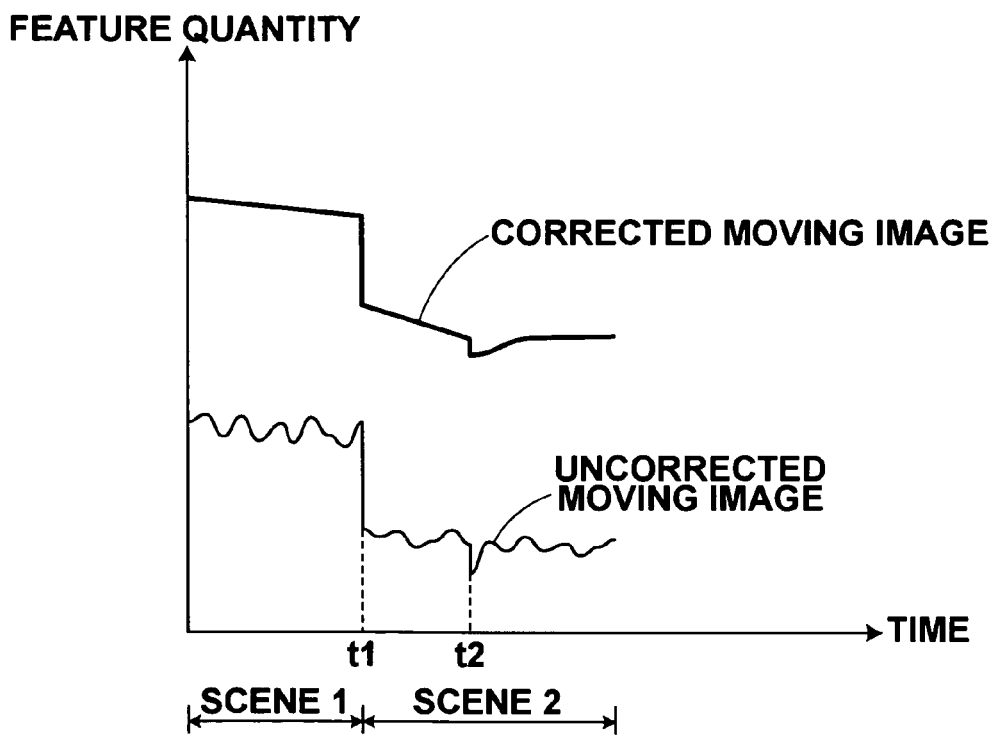

FIG. 14B shows the result of corrections made by the image processing system D of the fourth embodiment. A light line in the figure indicates the feature quantities of the picture frames of an uncorrected moving image, while a heavy line indicates the feature quantities of the picture frames of a corrected moving image. As shown in the figure, according to the image processing system D of the fourth embodiment, in a corrected moving image, corrections are made so that the feature quantities of the picture frames in the same scene vary smoothly in the temporal direction. Therefore, the flickering of a corrected moving image can be reliably prevented. In calculating the object feature quantity of a picture frame at a cut point (picture frame at time t1), a filter F (0, 0, 5, 0, 0) is employed and the object feature quantity is not influenced by the feature quantities of the two temporarily corrected thumbnail images before and after that picture frame. Therefore, a suitable correction is made with a correction value calculated based on the target feature quantity. In the case of a picture frame where a change in an image is great in the same scene (picture frame whose cut point probability is between 0 and 1), like a picture frame at time t2, the object feature quantity is influenced by the feature quantities of the two picture frames before and after that picture frame, but the degree of influence is smaller than that of an ordinary picture frame. For that reason, a suitable correction can be made on even a picture frame where a change in an image is great in the same scene, while eliminating the flickering of a corrected moving image.

The image processing system D calculates a temporary correction value for each of the picture frames of a moving image, then calculates a value by adjusting the feature quantities of temporarily corrected picture frames, obtained by making a temporary correction with the temporary correction value, so that the feature quantities vary smoothly in the temporal direction, and uses the obtained value as a target feature quantity. Furthermore, an object correction value for each picture frame is calculated so that the feature quantity of a picture frame becomes approximately equal to the target feature quantity. Therefore, the object correction value is obtained by directly inhibiting the target feature quantity, that is, variation of the feature quantities of picture frames corrected, while possessing the effect of an enhancement in image quality obtained by temporary correction. Therefore, the image processing system D is capable of more reliably eliminating the flickering of a corrected moving image than the image processing system C, shown in FIG. 7, for inhibiting only the variation of temporary correction values.

Processing steps performed in the image processing system D of the fourth embodiment will be described in reference to FIG. 15. The processing steps shown in the figure are performed on a single picture frame constituting a moving image. Therefore, the image processing system D of the fourth embodiment performs the processing steps shown in FIG. 15 on each of the picture frames of a moving image and obtains a corrected moving image.

Figure 15:
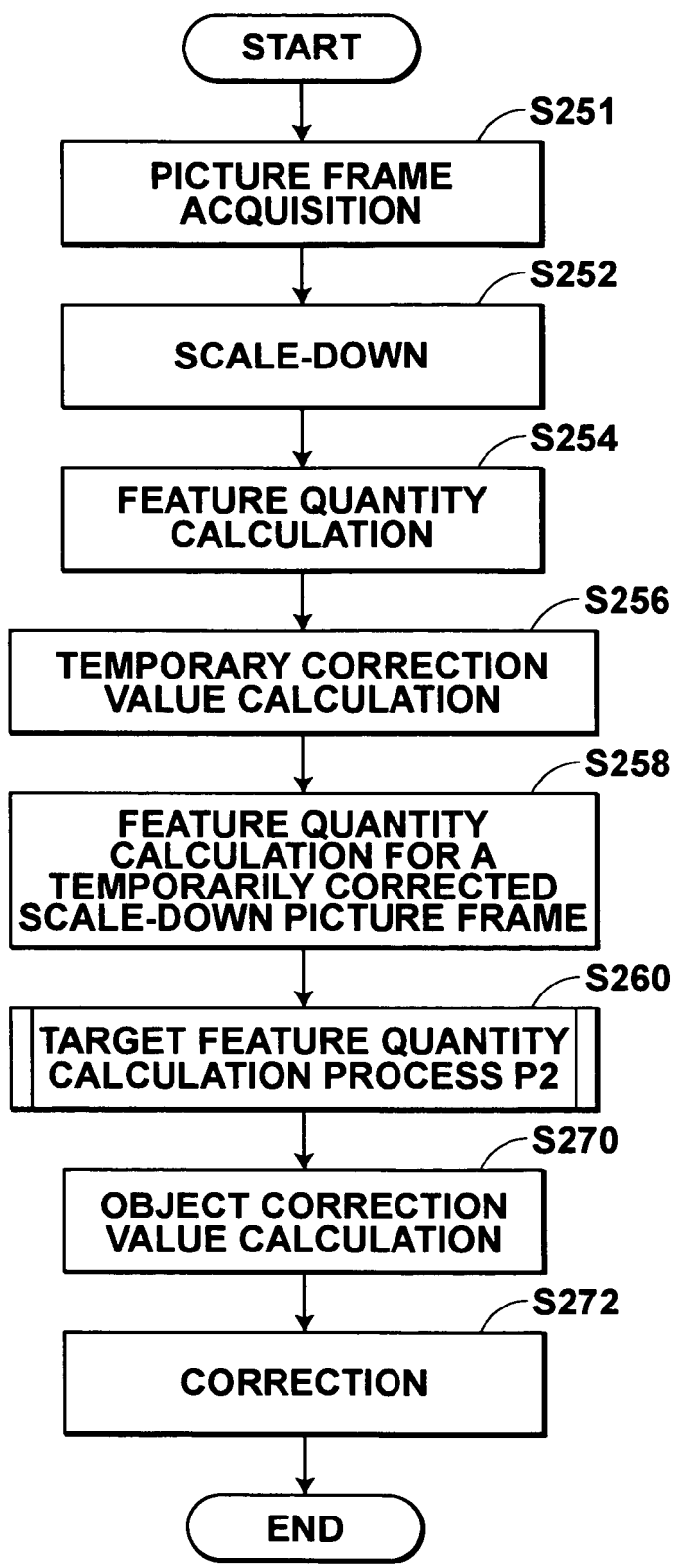
FIGS. 15 and 16 are flowcharts showing processing steps performed in the image processing system shown in FIG. 12.
Figure 16:
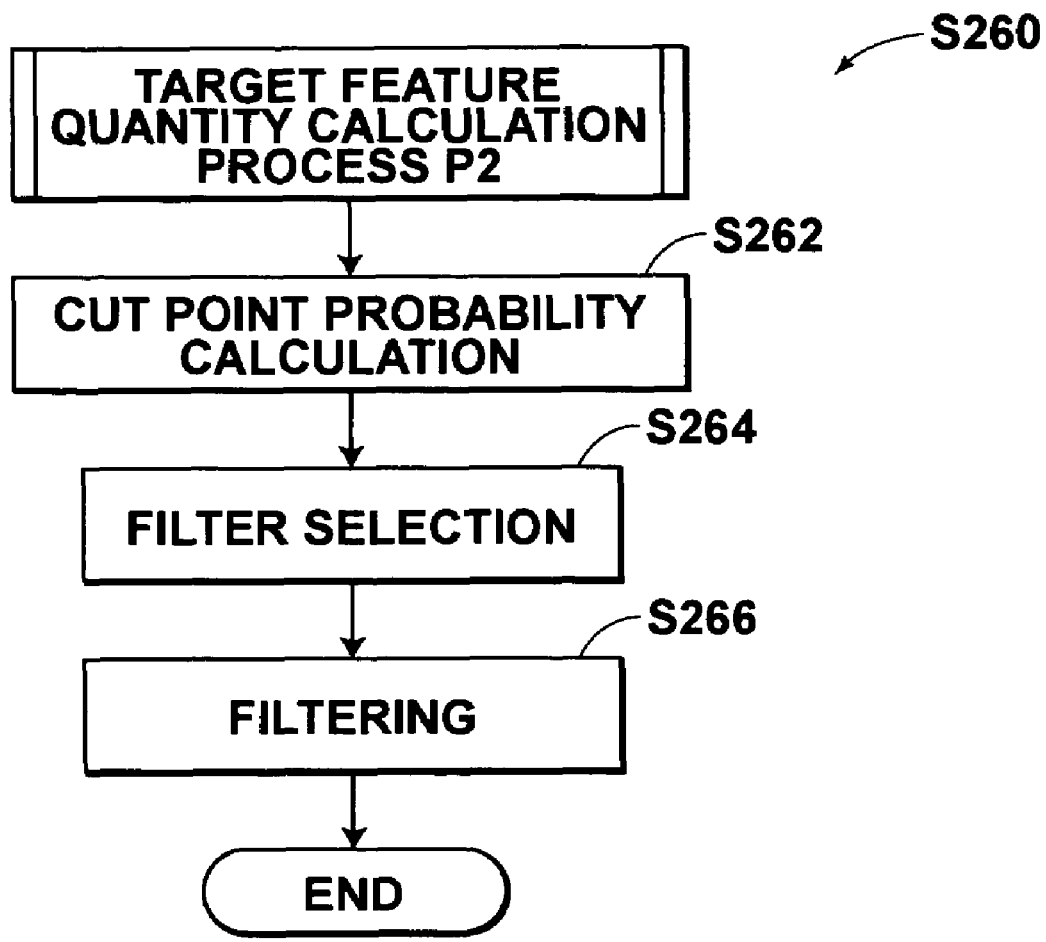

As shown in FIG. 15, a picture frame obtained by the image input means 251 is scaled down by the scale-down means 255 and is obtained as a thumbnail frame image (S251 and S252). The feature quantity calculation means 260 calculates a feature quantity Y0 from this thumbnail frame image (S254). The temporary correction value calculation means 265 calculates a temporary correction value γ0 for exposure correction, based on the calculated feature quantity Y0 (S256). The temporary correction means 270 calculates a feature quantity Y1 of a temporarily corrected thumbnail frame image, using the temporary correction value γ0 calculated in step S256 and the feature quantity Y0 calculated in step S254 (S258). The target feature quantity calculation means 280 obtains a target feature quantity Y2 by adjusting the feature quantities Y1 so that they vary smoothly in the temporal direction (S260). The object correction value calculation means 290 calculates an object correction value γ1 so that the feature quantity Y0 calculated in step S254 becomes the target feature quantity Y2 calculated in step S260 (S270). The correction means 295 corrects the picture frame obtained by the image input means 251, using the object correction value γ1 (S272). The target feature quantity calculation process P2 performed in step S260 by the target feature quantity calculation means 280 is shown in detail in FIG. 16. As shown in the figure, in the target feature quantity calculation means 280, the cut point probability calculation means 274 calculates a cut point probability β0 for a picture frame of interest (S262). Then, the filter means 276 selects a filter corresponding to the calculated cut point probability β0, and calculates the target feature quantity Y2 of a picture frame of interest by performing a filter process on the feature quantities Y1 of five successive picture frames (feature quantities of temporarily corrected thumbnail images) with the picture frame of interest as the center, with the selected filter (S264 and S266). As shown in FIG. 13, the filter selected in step S264 is constructed such that if the cut point probability β0 becomes greater, the influence on the target feature quantity by the two picture frames before and after a picture frame of interest becomes smaller.

Figure 17:
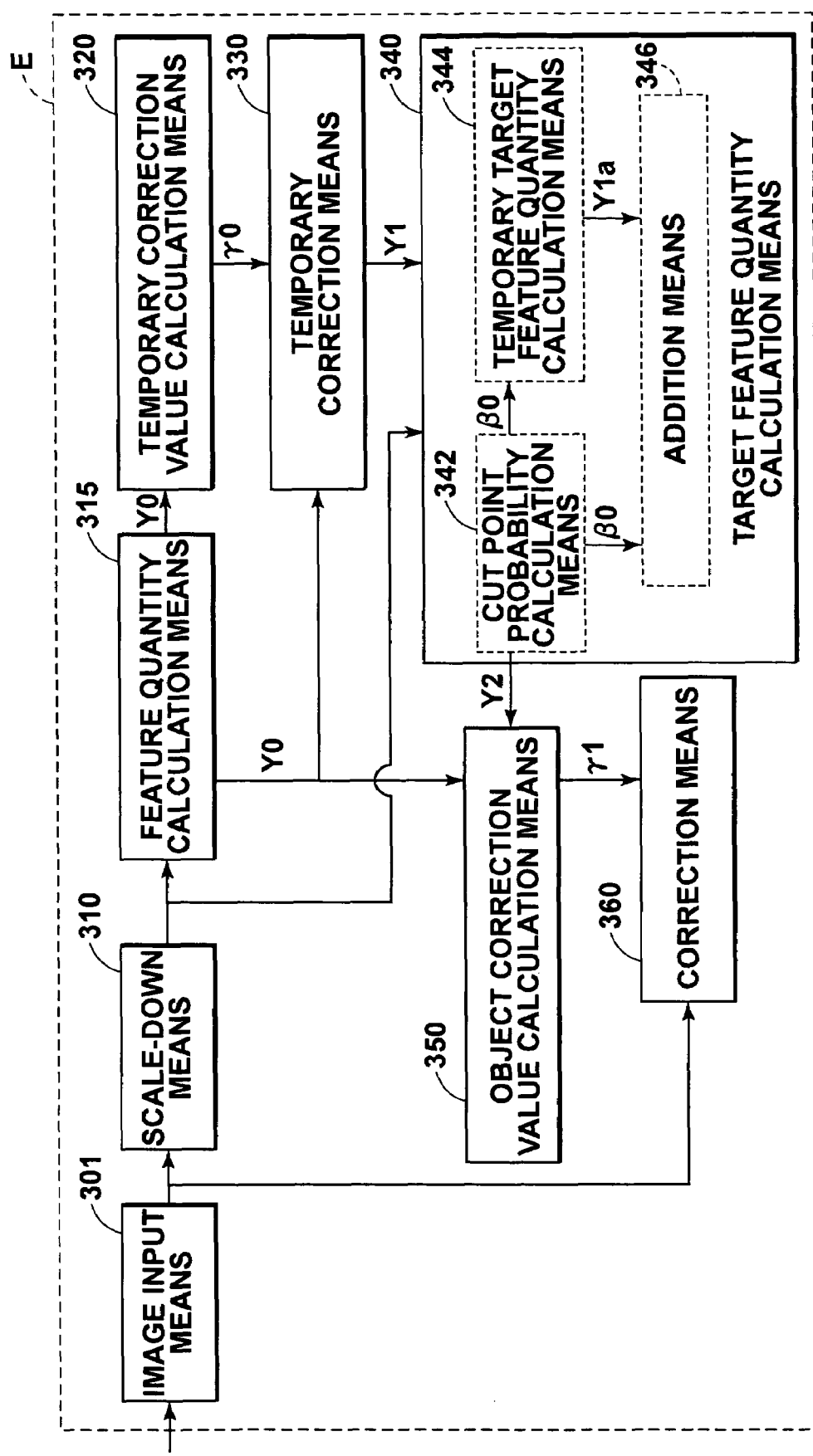
FIG. 17 is a block diagram showing an image processing system constructed in accordance with a fifth embodiment of the present invention.

Referring to FIG. 17, there is shown an image processing system E constructed in accordance with a fifth embodiment of the present invention. As shown in the figure, the image processing system E of the fifth embodiment has eight major parts: (1) image input means 301 for acquiring a plurality of picture frames constituting a moving image; (2) scale-down means 310 for scaling down a picture frame and obtaining a thumbnail frame image; (3) feature quantity calculation means 315 for calculating a feature quantity of a thumbnail frame image; (4) temporary correction value calculation means 320 for calculating a temporary correction value using the feature quantity calculated by the feature quantity calculation means 315; (5) temporary correction means 330 for calculating a feature quantity of a temporarily corrected thumbnail frame image obtained by correcting a thumbnail frame image, using the temporary correction value calculated by the temporary correction value calculation means 320; (6) target feature quantity calculation means 340 for calculating a target feature quantity of each thumbnail frame image using the feature quantity calculated by the temporary correction means 330; (7) object correction value calculation means 350 for calculating an object correction value for each picture frame so that the feature quantity calculated by the feature quantity calculation means 315 becomes the target feature quantity calculated by the target feature quantity calculation means 340; and (8) correction means 360 for obtaining a corrected moving image by correcting each picture frame, using the object correction value calculated by the object correction value calculation means 350. In the image processing system E of the fifth embodiment, only the target feature quantity calculation means 340 differs from the feature quantity calculation means 280 of the image processing system D shown in FIG. 12, and the remaining construction is the same. Therefore, only the processing steps to be performed by the target feature quantity calculation means 340 will be described and a detailed description of the remaining construction is omitted.

The target feature quantity calculation means 340 of the image processing system E obtains a target feature quantity by adjusting the feature quantities of temporarily corrected thumbnail images so that the feature quantities vary smoothly in the temporal direction. As shown in FIG. 17, the target feature quantity calculation means 340 comprises three major parts: (1) cut point probability calculation means 342 for calculating a cut point probability β0, which is the magnitude of a probability of a picture frame being a cut point representing a switch from one scene to another, for each picture frame; (2) temporary target feature quantity calculation means 344 for obtaining a temporary target feature quantity Y1a by smoothing the feature quantities Y1 of temporarily corrected thumbnail images obtained by the temporary correction means 330; and (3) addition means 346 for obtaining a target feature quantity Y2 by performing the weighted addition of the feature quantity Y1 of a temporarily corrected thumbnail frame image of interest and the temporary target feature quantity Y1a, with weight in dependence on the cut point probability β0 of the temporarily corrected thumbnail frame image of interest.

The cut point probability calculation means 342 calculates a cut point probability, based on the configuration of a histogram for the density values of a picture frame, as with the cut point probability calculation means 274 of the image processing system D shown in FIG. 12. Therefore, a detailed description of the cut point probability calculation means 342 is omitted.

The temporary target feature quantity calculation means 344 calculates a value by averaging the feature quantities Y1 of five temporarily corrected thumbnail images (i.e., a temporarily corrected thumbnail frame image of interest, two temporarily corrected thumbnail images before the thumbnail frame image of interest, and two temporarily corrected thumbnail images after the thumbnail frame image of interest) and uses the calculated value as the temporary target feature quantity Y1a of the temporarily corrected thumbnail frame image of interest.

The addition means 346 obtains the target feature quantity Y2 of a temporarily corrected thumbnail frame image of interest by performing the weighted addition of the feature quantity Y1 and the temporary target feature quantity Y1a in such a way that as the cut point probability of the temporarily corrected thumbnail frame image of interest becomes greater, the weight of the feature quantity Y1 becomes greater and the weight of the temporary target feature quantity Y1a becomes smaller, according to the following Eq. (18):

$$Y2 = \beta 0 \times Y1 + (1 - \beta 0) \times Y1a \qquad (18)$$

where
  Y2 = target feature quantity of the temporarily corrected thumbnail frame image of interest,
  Y1 = feature quantity of the temporarily corrected thumbnail frame image of interest,
  Y1a = temporary target feature quantity,
  β0 = cut point probability of the temporarily corrected thumbnail frame image of interest.

FIG. 18 shows processing steps performed in the target feature quantity calculation means 340 of the image processing system E shown in FIG. 17. As shown in the figure, in the target feature quantity calculation means 340 of the image processing system E, the cut point probability calculation means 342 calculates the cut point probability β0 of an picture frame of interest (S300). The temporary target feature quantity calculation means 344 calculates the temporary target feature quantity Y1a of a temporarily corrected thumbnail frame image of interest by averaging the feature quantities Y1 of five temporarily corrected thumbnail images (i.e., a temporarily corrected thumbnail frame image of interest, two temporarily corrected thumbnail images before the thumbnail frame image of interest, and two temporarily corrected thumbnail images after the thumbnail frame image of interest) (S310). And the addition means 346 calculates the target feature quantity Y2 of the temporarily corrected thumbnail frame image of interest by the weighted addition of the feature quantity Y1 and the temporary target feature quantity Y1a (S320). Note that the weighted addition in step S320 by the addition means is performed in such a way that as the cut point probability β0 becomes greater, the weight of the feature quantity Y1 becomes greater and the weight of the temporary target feature quantity Y1a becomes smaller.

In the image processing system E of the fifth embodiment, the method of calculating target feature quantities is different from that of the image processing system D. However, if the cut point probability of a picture frame becomes greater, the target feature quantity is calculated so that the influence by the two picture frames before and after that picture frame becomes smaller. Therefore, the image processing system E is able to obtain the same advantages as the image processing system D. In addition, since the weights of the feature quantity Y1 and temporary target feature quantity Y1a are adjusted in dependence on the magnitude of a cut point probability, processing is simple.

While the present invention has been described with reference to the preferred embodiments thereof, the invention is not to be limited to the details given herein, but may be modified within the scope of the invention hereinafter claimed.

For example, in the image processing systems D and E, the processing steps from the calculation of temporary correction values to the calculation of target feature quantities are performed on picture frames constituting a moving image. However, the aforementioned processing steps may be performed only on reference picture frames selected from the picture frames of a moving image. Also, the target feature quantities of other picture frames may be calculated by performing an interpolation process, such as spline interpolation, linear interpolation, etc., on the target feature quantities of the reference picture frames. In this manner, because the calculation of temporary correction values, the calculation of feature quantities of temporarily corrected thumbnail images, etc., are performed on only the reference picture frames, speedup of processing can be achieved. The selection of reference picture frames can be performed by calculating the similarity between picture frames in the temporal direction and determining the interval between reference picture frames. The similarity can employ the correlation between picture frames. For instance, the similarity can be made higher as the correlation becomes greater. If the determined interval between reference picture frames is n (where n is an integer $\geq 2$), the first picture frame, the $(n+1)^{st}$ picture frame, the $(2n+1)^{st}$ picture frame, the $(3n+1)^{st}$ picture frame, . . . can be selected from the picture frames of a moving image as reference picture frames.

In the aforementioned image processing systems C to E, while the processing steps from the calculation of feature quantities to the calculation of object correction values are performed on thumbnail images to achieve speedup of processing, these processing steps may be performed directly on original picture frames without scaling down them. Also, in scaling down picture frames, the scale-down ratio may be adjusted in dependence on the required processing time or the resolution of original picture frames.

The aforementioned image processing systems C to E employ the mean value Y0 of a density histogram as the feature quantity of a picture frame, but may employ a representative value, such as an average, a median, etc., of densities within a picture frame, as the feature quantity.

The present invention may employ luminance instead of the density employed in the aforementioned embodiments C to E.

The aforementioned image processing systems C to E perform a correction of exposure on a moving image. However, the image processing method and system of the present invention are applicable not only to exposure correction, but also to other image quality corrections, such as the aforementioned white balance correction, color saturation correction, contrast correction, sharpness correction, color correction, a combination of these corrections, etc.

The aforementioned image processing systems C to E correct picture frames, employing object correction values. However, an original moving image, along with object correction values, may be stored on a data storage medium or transmitted to processing systems provided on networks, without carrying out corrections, and corrections may be made when instructed.

What is claimed is:

1. An image processing method comprising:
   calculating a feature quantity of each of a plurality of picture frames, said plurality of picture frames constituting a moving image;
   calculating, by a processor of a computer, a temporary correction value for correcting picture quality of each of the plurality of picture frames from said picture frame;
   calculating a feature quantity of a temporarily corrected picture frame, which is obtained by correcting each of said picture frames with said temporary correction value;
   calculating a target feature quantity of said picture frame to which said temporarily corrected picture frame corresponds, said target feature quantity being obtained by adjusting the feature quantities of the temporarily corrected picture frames so that the feature quantities vary smoothly in a temporal direction;
   calculating an object correction value for each of said picture frames so that the feature quantity of each of the plurality of picture frames becomes approximately equal to said target feature quantity of said picture frame
   obtaining a corrected moving image using said object correction value,
   where in the temporary correction value ($\gamma o$) is calculated using the equation:
   $\gamma o = Yd - Yo$, wherein Yd is a target image density for each image and Yo is a mean value of image density for each image.

2. The image processing method as set forth in claim 1, wherein said calculating a temporary correction value, said calculating a feature quantity of a temporarily corrected picture frame, and said calculating a target feature quantity are performed on only reference picture frames selected from said plurality of picture frames, and
   said method further comprising:
   obtaining said target feature quantity of each of said plurality of picture frames by performing an interpolation process on each of said target feature quantities obtained using said reference picture frames.

3. The image processing method as set forth in claim 1, wherein said calculating a feature quantity of each of a plurality of picture frames, said calculating a temporary correction value, said calculating a feature quantity of a temporarily corrected picture frame temporary correction step, said calculating a target feature quantity of said picture frame, and said calculating an object correction value are performed using thumbnail images of said picture frames, which constitute said moving image.

4. The image processing method as set forth in claim 1, wherein said obtaining a corrected moving image comprises correcting said picture frame to which said object correction value corresponds, using said object correction value.

5. An image processing system comprising:
   feature quantity calculation means for calculating a feature quantity of each of a plurality of picture frames that constitute a moving image;

temporary correction value calculation means for calculating a temporary correction value for correcting picture quality of each of said picture frames, from the picture frame;

temporary correction means for calculating a feature quantity of a temporarily corrected picture frame obtained by correcting each of said picture frames with said temporary correction value calculated by said temporary correction value calculation means;

target feature quantity calculation means for calculating a value, obtained by adjusting the feature quantities of the temporarily corrected picture frames so that the feature quantities vary smoothly in a temporal direction, as a target feature quantity of said picture frame to which said temporarily corrected picture frame corresponds; and object correction value calculation means for calculating an object correction value for each of said picture frames so that the feature quantity of each of said picture frames calculated by said feature quantity calculation means becomes approximately equal to said target feature quantity of the picture frame, where in the temporary correction value ($\gamma o$) is calculated using the equation:

$\gamma o = Yd - Yo$, wherein Yd is a target image density for each image and Yo is a mean value of image density for each image.

6. The image processing system as set forth in claim 5, wherein said temporary correction value calculation means, said temporary correction means, and said target feature quantity calculation means respectively perform said calculations on only reference picture frames selected from said plurality of picture frames, and which further comprises interpolation means for obtaining said target feature quantity of each of said plurality of picture frames by performing an interpolation process on each of said target feature quantities obtained by employing said reference picture frames.

7. The image processing system as set forth in claim 5, wherein said feature quantity calculation means, said temporary correction value calculation means, said temporary correction means, said target feature quantity calculation means, and said object correction value calculation means respectively perform said calculations, employing thumbnail images of said picture frames that constitute said moving image.

8. The image processing system as set forth in claim 5, further comprising correction means for correcting said picture frame to which said object correction value corresponds, employing said object correction value.

9. A computer readable storage memory encoded with a program for causing a computer to carry out:

calculating a feature quantity of each of a plurality of picture frames, said plurality of picture frames constituting a moving image;

calculating a temporary correction value for correcting picture quality of each of plurality of picture frames from said picture frame;

calculating a feature quantity of a temporarily corrected picture frame obtained by correcting each of the picture frames with said temporary correction value;

a target feature quantity calculation step of calculating a target feature quantity of said picture frame to which said temporarily corrected picture frame corresponds, said target feature quantity being obtained by adjusting the feature quantities of the temporarily corrected picture frames so that the feature quantities vary smoothly in a temporal direction; and calculating an object correction value for each of said picture frames so that the feature quantity of each of the plurality of picture frames becomes approximately equal to said target feature quantity of said picture frames, where in the temporary correction value ($\gamma o$) is calculated using the equation:

$\gamma o = Yd - Yo$, wherein Yd is a target image density for each image and Yo is a mean value of image density for each image.

10. The computer readable storage memory encoded with the program as set forth in claim 9, wherein said computer is caused to calculate said temporary correction value, , said feature quantity of said temporarily corrected picture frame, and said target feature quantity using only reference picture frames selected from said plurality of picture frames; and said computer is farther caused to obtain said target feature quantity of each of said plurality of picture frames by performing an interpolation process on each of said target feature quantities obtained using said reference picture frames.

11. The computer readable storage memory encoded with the program as set forth in claim 9, wherein said computer is fun her caused to correct said picture frame to which said object correction value corresponds using said object correction value.

12. The image processing method as set forth in claim 1, wherein the calculating a feature quantity for each of a plurality of picture frames comprises:

forming a density histogram of the image, and calculating the mean value (Yo) of the histogram.

13. The image processing method as set forth in claim 1, wherein the feature quantity is at least one of a luminance value, saturation value, gradation value, and hue histogram.

14. An image processing method comprising:

calculating a feature quantity of each of a plurality of picture frames, said plurality of picture frames constituting a moving image;

calculating, by a processor of a computer, a temporary correction value for correcting picture quality of each of the plurality of picture frames from said picture frame;

calculating a feature quantity of a temporarily corrected picture frame, which is obtained by correcting each of said picture frames with said temporary correction value;

calculating a target feature quantity of said picture frame to which said temporarily corrected picture frame corresponds, said target feature quantity being obtained by adjusting the feature quantities of the temporarily corrected picture frames so that the feature quantities vary smoothly in a temporal direction;

calculating an object correction value for each of said picture frames so that the feature quantity of each of the plurality of picture frames becomes approximately equal to said target feature quantity of said picture frame obtaining a corrected moving image using said object correction value, wherein the feature quantity (Y1) of the temporarily corrected picture frame is calculated using the equation:

$Y1 = Yo + \gamma o$, wherein Yo is a mean value of image density for each image, and $\gamma o$ is the temporary correction value for each image.

15. An image processing method comprising:

calculating a feature quantity of each of a plurality of picture frames, said plurality of picture frames constituting a moving image;

calculating, by a processor of a computer, a temporary correction value for correcting picture quality of each of the plurality of picture frames from said picture frame;

calculating a feature quantity of a temporarily corrected picture frame, which is obtained by correcting each of said picture frames with said temporary correction value;

calculating a target feature quantity of said picture frame to which said temporarily corrected picture frame corresponds, said target feature quantity being obtained by adjusting the feature quantities of the temporarily corrected picture frames so that the feature quantities vary smoothly in a temporal direction;

calculating an object correction value for each of said picture frames so that the feature quantity of each of the plurality of picture frames becomes approximately equal to said target feature quantity of said picture frame obtaining a corrected moving image using said object correction value, wherein the target feature quantity (Y2) is the average of (1) the feature quantity of a first temporarily corrected picture frame, (2) the feature quantity of at least one temporarily corrected picture frame proceeding the first temporarily corrected picture frame, and (3) the feature quantity of at least one temporarily corrected picture frame subsequent to the first temporarily corrected picture frame.

16. An image processing system comprising:

feature quantity calculation means for calculating a feature quantity of each of a plurality of picture frames that constitute a moving image;

temporary correction value calculation means for calculating a temporary correction value for correcting picture quality of each of said picture frames, from the picture frame;

temporary correction means for calculating a feature quantity of a temporarily corrected picture frame obtained by correcting each of said picture frames with said temporary correction value calculated by said temporary correction value calculation means;

target feature quantity calculation means for calculating a value, obtained by adjusting the feature quantities of the temporarily corrected picture frames so that the feature quantities vary smoothly in a temporal direction, as a target feature quantity of said picture frame to which said temporarily corrected picture frame corresponds; and object correction value calculation means for calculating an object correction value for each of said picture frames so that the feature quantity of each of said picture frames calculated by said feature quantity calculation means becomes approximately equal to said target feature quantity of the picture frame, wherein the feature quantity (Y1) of the temporarily corrected picture frame is calculated using the equation:
$Y1 = Yo + \gamma o$, wherein Yo is a mean value of image density for each image, and $\gamma o$ is the temporary correction value for each image.

17. An image processing system comprising:

feature quantity calculation means for calculating a feature quantity of each of a plurality of picture frames that constitute a moving image;

temporary correction value calculation means for calculating a temporary correction value for correcting picture quality of each of said picture frames, from the picture frame;

temporary correction means for calculating a feature quantity of a temporarily corrected picture frame obtained by correcting each of said picture frames with said temporary correction value calculated by said temporary correction value calculation means;

target feature quantity calculation means for calculating a value, obtained by adjusting the feature quantities of the temporarily corrected picture frames so that the feature quantities vary smoothly in a temporal direction, as a target feature quantity of said picture frame to which said temporarily corrected picture frame corresponds; and object correction value calculation means for calculating an object correction value for each of said picture frames so that the feature quantity of each of said picture frames calculated by said feature quantity calculation means becomes approximately equal to said target feature quantity of the picture frame, wherein the target feature quantity (Y2) is the average of (1) the feature quantity of a first temporarily corrected picture frame, (2) the feature quantity of at least one temporarily corrected picture frame proceeding the first temporarily corrected picture frame, and (3) the feature quantity of at least one temporarily corrected picture frame subsequent to the first temporarily corrected picture frame.

18. A computer readable storage memory encoded with a program for causing a computer to carry out:

calculating a feature quantity of each of a plurality of picture frames, said plurality of picture frames constituting a moving image;

calculating a temporary correction value for correcting picture quality of each of plurality of picture frames from said picture frame;

calculating a feature quantity of a temporarily corrected picture frame obtained by correcting each of the picture frames with said temporary correction value;

a target feature quantity calculation step of calculating a target feature quantity of said picture frame to which said temporarily corrected picture frame corresponds, said target feature quantity being obtained by adjusting the feature quantities of the temporarily corrected picture frames so that the feature quantities vary smoothly in a temporal direction; and calculating an object correction value for each of said picture frames so that the feature quantity of each of the plurality of picture frames becomes approximately equal to said target feature quantity of said picture frame, wherein the feature quantity (Y1) of the temporarily corrected picture frame is calculated using the equation:
$Y1 = Yo + \gamma o$, wherein Yo is a mean value of image density for each image, and $\gamma o$ is the temporary correction value for each image.

19. A computer readable storage memory encoded with a program for causing a computer to carry out:

calculating a feature quantity of each of a plurality of picture frames, said plurality of picture frames constituting a moving image;

calculating a temporary correction value for correcting picture quality of each of plurality of picture frames from said picture frame;

calculating a feature quantity of a temporarily corrected picture frame obtained by correcting each of the picture frames with said temporary correction value;

a target feature quantity calculation step of calculating a target feature quantity of said picture frame to which said temporarily corrected picture frame corresponds, said target feature quantity being obtained by adjusting the feature quantities of the temporarily corrected picture frames so that the feature quantities vary smoothly in a temporal direction; and calculating an object correction value for each of said picture frames so that the feature quantity of each of the plurality of picture frames becomes approximately equal to said target feature quantity of said picture frame, wherein the target feature quantity (Y2) is the average of (1) the feature quantity of a first temporarily corrected picture frame, (2) the feature quantity of at least one temporarily corrected picture frame proceeding the first temporarily corrected picture frame, and (3) the feature quantity of at least one temporarily corrected picture frame subsequent to the first temporarily corrected picture frame.

* * * * *